US012442238B2

(12) United States Patent
Sellinger et al.

(10) Patent No.: US 12,442,238 B2
(45) Date of Patent: *Oct. 14, 2025

(54) DOOR POSITIONING SYSTEM

(71) Applicant: Masonite Corporation, Tampa, FL (US)

(72) Inventors: Joel Sellinger, Blaine, WA (US); Benjamin W. Docksteader, Custer, WA (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,206

(22) Filed: May 22, 2023

(65) Prior Publication Data

US 2023/0287724 A1 Sep. 14, 2023

Related U.S. Application Data

(63) Continuation of application No. 17/522,147, filed on Nov. 9, 2021, now Pat. No. 11,655,662, which is a (Continued)

(51) Int. Cl.
*E05F 15/611* (2015.01)
*E05F 1/00* (2006.01)
(Continued)

(52) U.S. Cl.
CPC ............ *E05F 15/611* (2015.01); *E05F 1/002* (2013.01); *E05F 3/226* (2013.01); *E05F 15/77* (2015.01);
(Continued)

(58) Field of Classification Search
CPC ....... E05F 15/611; E05F 15/77; E05F 15/624; E05F 1/002; E05F 3/226; E05F 2015/765; E05Y 2400/10; E05Y 2400/85
(Continued)

(56) References Cited

U.S. PATENT DOCUMENTS 657,211 A 9/1900 Carleton
1,427,991 A 9/1922 Whittaker
(Continued)

FOREIGN PATENT DOCUMENTS

AU 2020101466 A4 8/2020
CN 200968110 Y 10/2007
(Continued)

OTHER PUBLICATIONS

European Search Report Issued in European Application No. 18791855.2-1005 dated Nov. 20, 2020, 9 Pages.
(Continued)

*Primary Examiner* — Gregory J Strimbu
*Assistant Examiner* — Patrick B. Ponciano
(74) *Attorney, Agent, or Firm* — IceMiller LLP

(57) ABSTRACT

An apparatus comprising a baseplate configured to be coupled to a door configured to be positioned in an open door position, a closed door position, and a plurality of door positions in between the open position and closed position; a motor; a circuitry electrically coupled to the motor and configured to be in communication with a remote computing device; at least one proximity sensor electrically coupled to the circuitry and configured to determine the door position with respect to a door frame; a drive wheel coupled to the motor and the circuitry, the drive wheel comprising an external surface, the external surface of the drive wheel configured to rotatably contact a ground surface; and wherein the motor is configured to be remotely activated by the remote computing device to engage the drive wheel to rotatably contact the ground surface to reposition the door responsive to receipt of a signal.

19 Claims, 18 Drawing Sheets

Related U.S. Application Data continuation of application No. 16/359,780, filed on Mar. 20, 2019, now Pat. No. 11,174,664.

(60) Provisional application No. 62/645,499, filed on Mar. 20, 2018, provisional application No. 62/645,515, filed on Mar. 20, 2018.

(51) Int. Cl.
*E05F 3/22* (2006.01)
*E05F 15/77* (2015.01)
*E05F 15/73* (2015.01)

(52) U.S. Cl.
CPC ..... *E05F 2015/765* (2015.01); *E05Y 2400/10* (2013.01); *E05Y 2400/8515* (2024.05)

(58) Field of Classification Search
USPC .......................................................... 49/358
See application file for complete search history.

(56) References Cited

U.S. PATENT DOCUMENTS 1,694,431 A * 12/1928 Russell ................ E05F 15/624 49/358
1,762,499 A 6/1930 Baume
2,827,284 A * 3/1958 Bunzl .................. E05F 15/624 49/32
3,606,699 A 9/1971 Robinson, Jr.
3,733,861 A 5/1973 Lester
3,825,973 A 7/1974 Gwozdz
3,889,316 A 6/1975 Koike
3,889,874 A 6/1975 Arwood
4,188,984 A 2/1980 Lyall
4,672,773 A 6/1987 Bilt
4,754,572 A * 7/1988 Bilt ...................... E05F 15/632 49/358
5,626,039 A 5/1997 Solari et al.
5,652,563 A 7/1997 Maus
5,746,166 A 5/1998 Valasopoulos
5,790,034 A 8/1998 Khoury
5,791,179 A 8/1998 Brask
5,878,530 A 3/1999 Eccleston et al.
5,937,478 A 8/1999 Regnier
5,979,199 A 11/1999 Elpern et al.
6,142,541 A 11/2000 Rotondi
6,481,160 B1 11/2002 Kowalczyk
6,891,479 B1 5/2005 Eccleston
7,021,005 B1 * 4/2006 Curry ................... E05F 15/635 49/358
7,367,161 B1 5/2008 Jones
7,516,633 B1 4/2009 Chang
7,610,684 B2 11/2009 Steinich
7,698,917 B2 4/2010 Lie-Nielsen et al.
7,824,200 B2 11/2010 Bryla et al.
8,156,671 B2 4/2012 Presley et al.
8,169,169 B2 5/2012 Hass et al.
8,176,761 B2 5/2012 Sorensen et al.
8,220,202 B2 7/2012 Riley et al.
8,261,491 B2 9/2012 Yulkowski et al.
8,272,242 B1 9/2012 Lee et al.
8,337,039 B1 12/2012 Larkin
8,354,914 B2 1/2013 Buckingham et al.
8,772,970 B2 7/2014 Lambrou
9,109,378 B2 8/2015 Scalisi
9,290,966 B2 3/2016 Hanchett, Jr.
9,342,936 B2 5/2016 Scalisi
9,574,372 B2 2/2017 Johnson et al.
9,574,389 B2 2/2017 Menze et al.
9,652,917 B2 5/2017 Johnson et al.
9,697,661 B1 7/2017 Dumas et al.
9,704,320 B2 7/2017 Johnson et al.
9,725,941 B2 * 8/2017 Van Tassell, III .... E05F 15/635
9,790,711 B2 10/2017 McKibben et al.
9,838,736 B2 12/2017 Smith et al.
9,922,513 B1 3/2018 Hall et al.
10,037,636 B2 7/2018 Ho et al.
10,043,332 B2 8/2018 Scalisi et al.
10,053,898 B1 8/2018 Lashley et al.
10,081,977 B2 * 9/2018 Shelley ................ E05F 15/641
10,361,880 B1 7/2019 Marcinkowski et al.
10,453,280 B2 10/2019 Kontturi
10,626,651 B2 4/2020 Chang
10,664,688 B2 5/2020 Goulden et al.
10,691,953 B2 6/2020 Johnson et al.
10,733,823 B2 8/2020 Scalisi
10,755,509 B2 8/2020 Saeedi et al.
10,803,685 B2 10/2020 Marcinkowski et al.
10,818,118 B2 10/2020 Sivalingam et al.
10,938,250 B2 3/2021 Ahmed et al.
10,947,768 B2 3/2021 Walser
10,950,076 B1 3/2021 Hall et al.
10,964,138 B2 3/2021 Geerlings et al.
10,997,547 B2 5/2021 Hall et al.
10,999,092 B2 5/2021 Marcinkowski et al.
11,002,061 B1 5/2021 Maiga et al.
11,072,964 B2 7/2021 Teta et al.
11,136,812 B2 * 10/2021 Rabinowitz ........... E05F 15/624
11,174,664 B2 * 11/2021 Sellinger ................ E05F 15/77
11,174,666 B2 11/2021 Demele et al.
11,215,003 B2 1/2022 Nash
11,244,523 B1 2/2022 Brady et al.
11,248,410 B2 2/2022 Dreyer et al.
11,261,644 B2 3/2022 Eccleston
11,290,298 B2 3/2022 Marcinkowski et al.
11,339,604 B2 5/2022 Dreyer
11,346,141 B2 5/2022 Gregoriou
11,346,150 B1 5/2022 Johnston
11,352,812 B2 6/2022 Johnson
11,373,471 B2 6/2022 Anderson et al.
D957,688 S 7/2022 Kim et al.
11,377,895 B2 * 7/2022 Cohen ...................... E05F 5/02
11,388,373 B2 7/2022 Scalisi
11,403,899 B2 8/2022 Zhang
11,403,902 B2 8/2022 Ho et al.
11,417,200 B2 8/2022 Hass et al.
11,434,682 B2 9/2022 Sellinger et al.
11,441,332 B2 9/2022 Johnson et al.
11,486,185 B2 * 11/2022 Tulsidas ................ G06V 40/40
11,532,192 B2 12/2022 Hass et al.
11,536,078 B2 12/2022 Dreyer
11,539,794 B1 12/2022 Weber et al.
11,543,801 B2 1/2023 Hall et al.
11,585,143 B1 * 2/2023 Iriarte ................ E05B 47/0001
11,608,670 B2 3/2023 Sellinger et al.
11,639,625 B2 * 5/2023 Chi-Hsueh ............. E05F 15/73 49/334
11,655,662 B2 * 5/2023 Sellinger ................ E05F 1/002 49/31
11,655,669 B2 5/2023 Hutton et al.
11,692,384 B2 * 7/2023 Jaroff ...................... E05F 11/54 49/324
11,694,287 B2 7/2023 Marcinkowski et al.
11,697,958 B1 7/2023 Weinerman et al.
11,713,610 B2 8/2023 Docksteader et al.
11,729,014 B2 8/2023 Marcinkowski et al.
11,767,710 B1 9/2023 Johnston
2004/0103584 A1 * 6/2004 Freeman .............. E05F 15/624 704/E15.045
2005/0091928 A1 5/2005 Okulov et al.
2006/0093307 A1 5/2006 Lowentat et al.
2006/0124249 A1 6/2006 Hsieh
2009/0027198 A1 1/2009 Dipoala et al.
2009/0260292 A1 10/2009 Hansch
2010/0065705 A1 3/2010 Brown et al.
2010/0115853 A1 5/2010 Gebhart et al.
2010/0242368 A1 9/2010 Yulkowski
2011/0016971 A1 1/2011 Yulkowski
2011/0252597 A1 10/2011 Burris et al.
2012/0073083 A1 3/2012 Staude
2012/0272576 A1 11/2012 Van Tassell, III et al.
2013/0145692 A1 6/2013 Laird et al.
2013/0205670 A1 8/2013 Springborn et al.

(56) References Cited

U.S. PATENT DOCUMENTS

| | | | | |
|---|---|---|---|---|
| 2013/0318878 | A1* | 12/2013 | Manseder | E05F 15/635 49/358 |
| 2013/0326960 | A1* | 12/2013 | Manseder | E05F 15/624 49/358 |
| 2014/0020295 | A1 | 1/2014 | Bonahoom et al. | |
| 2014/0145576 | A1 | 5/2014 | White et al. | |
| 2014/0190083 | A1* | 7/2014 | Lepie | E05B 43/00 49/280 |
| 2014/0196372 | A1 | 7/2014 | Boren et al. | |
| 2014/0267739 | A1 | 9/2014 | Ibsies | |
| 2015/0059249 | A1 | 3/2015 | Yulkowski | |
| 2015/0059250 | A1 | 3/2015 | Miu et al. | |
| 2015/0130287 | A1 | 5/2015 | Steudtner et al. | |
| 2016/0010378 | A1 | 1/2016 | Ziemkowski et al. | |
| 2016/0083990 | A1 | 3/2016 | Ricks et al. | |
| 2016/0084678 | A1 | 3/2016 | Ricks et al. | |
| 2016/0163139 | A1 | 6/2016 | Kankkunen et al. | |
| 2016/0179089 | A1 | 6/2016 | Stratmann | |
| 2016/0237732 | A1 | 8/2016 | Kerley | |
| 2016/0322847 | A1 | 11/2016 | Geiszler | |
| 2017/0040827 | A1 | 2/2017 | Weber | |
| 2017/0084144 | A1 | 3/2017 | Ricks et al. | |
| 2017/0260783 | A1 | 9/2017 | Crolley | |
| 2017/0292308 | A1 | 10/2017 | Beran | |
| 2017/0358952 | A1 | 12/2017 | Butler et al. | |
| 2018/0016836 | A1 | 1/2018 | Ibsies | |
| 2018/0058130 | A1* | 3/2018 | Shelley | E05F 15/624 |
| 2018/0080270 | A1 | 3/2018 | Khan et al. | |
| 2018/0108230 | A1 | 4/2018 | Finnegan | |
| 2018/0305969 | A1 | 10/2018 | Docksteader et al. | |
| 2019/0271186 | A1 | 9/2019 | Chen et al. | |
| 2019/0292829 | A1 | 9/2019 | Sellinger et al. | |
| 2019/0333302 | A1 | 10/2019 | Kagnew et al. | |
| 2019/0364244 | A1 | 11/2019 | Siminoff et al. | |
| 2019/0376332 | A1 | 12/2019 | Chi-Hsueh et al. | |
| 2019/0390503 | A1 | 12/2019 | Teta et al. | |
| 2020/0014552 | A1 | 1/2020 | Tan et al. | |
| 2020/0056414 | A1 | 2/2020 | Oestermann et al. | |
| 2020/0082240 | A1 | 3/2020 | Heitmar | |
| 2020/0102779 | A1 | 4/2020 | Rabinowitz | |
| 2020/0131824 | A1 | 4/2020 | Opgenorth | |
| 2020/0177051 | A1 | 6/2020 | Abe | |
| 2020/0190885 | A1 | 6/2020 | Coleman | |
| 2020/0217121 | A1 | 7/2020 | Paulsson et al. | |
| 2020/0349786 | A1 | 11/2020 | Ho et al. | |
| 2020/0378172 | A1 | 12/2020 | Lerpard | |
| 2020/0386029 | A1* | 12/2020 | Nash | E05F 15/624 |
| 2021/0025215 | A1 | 1/2021 | Sellinger et al. | |
| 2021/0032923 | A1 | 2/2021 | Docksteader et al. | |
| 2021/0207419 | A1 | 7/2021 | Sorice et al. | |
| 2021/0207420 | A1 | 7/2021 | Sorice et al. | |
| 2021/0207421 | A1 | 7/2021 | Sorice et al. | |
| 2021/0209878 | A1 | 7/2021 | Kim et al. | |
| 2021/0317697 | A1* | 10/2021 | Tulsidas | G06V 40/40 |
| 2022/0065019 | A1 | 3/2022 | Sellinger et al. | |
| 2022/0136305 | A1 | 5/2022 | Elwine et al. | |
| 2022/0155005 | A1 | 5/2022 | Lee et al. | |
| 2022/0186543 | A1 | 6/2022 | Soderqvist | |
| 2022/0263297 | A1* | 8/2022 | Bodurka | E06B 7/28 |
| 2022/0351722 | A1 | 11/2022 | Mandry et al. | |
| 2022/0392287 | A1 | 12/2022 | Shen | |
| 2022/0403692 | A1 | 12/2022 | Docksteader et al. | |
| 2023/0062621 | A1 | 3/2023 | Cheung | |
| 2023/0184022 | A1 | 6/2023 | Eliasson et al. | |
| 2023/0220721 | A1 | 7/2023 | Sellinger et al. | |
| 2023/0374843 | A1 | 11/2023 | Docksteader et al. | |
| 2024/0159097 | A1 | 5/2024 | Sellinger et al. | |

FOREIGN PATENT DOCUMENTS

| | | | |
|---|---|---|---|
| CN | 103606213 | A | 2/2014 |
| CN | 104105248 | A | 10/2014 |
| CN | 203925102 | U | 11/2014 |
| CN | 205117039 | U | 3/2016 |
| CN | 106761274 | A | 5/2017 |
| CN | 106836990 | A | 6/2017 |
| CN | 206309153 | U | 7/2017 |
| CN | 206329255 | U | 7/2017 |
| CN | 107191110 | A | 9/2017 |
| CN | 107448128 | A | 12/2017 |
| CN | 107575137 | A | 1/2018 |
| CN | 107610390 | A | 1/2018 |
| CN | 107643706 | A | 1/2018 |
| CN | 206903524 | U | 1/2018 |
| CN | 107705511 | A | 2/2018 |
| CN | 107730687 | A | 2/2018 |
| CN | 107747457 | A | 3/2018 |
| CN | 107795255 | A | 3/2018 |
| CN | 107829659 | A | 3/2018 |
| CN | 108118987 | A | 6/2018 |
| CN | 207458156 | U | 6/2018 |
| CN | 108389290 | A | 8/2018 |
| CN | 108399674 | A | 8/2018 |
| CN | 108412359 | A | 8/2018 |
| CN | 108442852 | A | 8/2018 |
| CN | 108661486 | A | 10/2018 |
| CN | 108756617 | A | 11/2018 |
| CN | 108868508 | A | 11/2018 |
| CN | 108915498 | A | 11/2018 |
| CN | 108924015 | A | 11/2018 |
| CN | 108952449 | A | 12/2018 |
| CN | 109098543 | A | 12/2018 |
| CN | 109138774 | A | 1/2019 |
| CN | 109191617 | A | 1/2019 |
| CN | 109191739 | A | 1/2019 |
| CN | 109236134 | A | 1/2019 |
| CN | 109236135 | A | 1/2019 |
| CN | 109267837 | A | 1/2019 |
| CN | 109472902 | A | 3/2019 |
| CN | 109629954 | A | 4/2019 |
| CN | 208777869 | U | 4/2019 |
| CN | 110009782 | A | 7/2019 |
| CN | 110264682 | A | 9/2019 |
| CN | 209429913 | U | 9/2019 |
| CN | 110409954 | A | 11/2019 |
| CN | 110505182 | A | 11/2019 |
| CN | 110531631 | A | 12/2019 |
| CN | 209990389 | U | 1/2020 |
| CN | 110778265 | A | 2/2020 |
| CN | 111173404 | A | 5/2020 |
| CN | 111270959 | A | 6/2020 |
| CN | 111343432 | A | 6/2020 |
| CN | 111441680 | A | 7/2020 |
| CN | 211038390 | U | 7/2020 |
| CN | 211124167 | U | 7/2020 |
| CN | 111505947 | A | 8/2020 |
| CN | 111540093 | A | 8/2020 |
| CN | 111653025 | A | 9/2020 |
| CN | 111764747 | A | 10/2020 |
| CN | 211851423 | U | 11/2020 |
| CN | 112096221 | A | 12/2020 |
| CN | 112211496 | A | 1/2021 |
| CN | 112267796 | A | 1/2021 |
| CN | 112330869 | A | 2/2021 |
| CN | 112491668 | A | 3/2021 |
| CN | 112539020 | A | 3/2021 |
| CN | 213205374 | U | 5/2021 |
| CN | 112901047 | A | 6/2021 |
| CN | 113048374 | A | 6/2021 |
| CN | 113129476 | A | 7/2021 |
| CN | 113338772 | A | 9/2021 |
| CN | 113345130 | A | 9/2021 |
| CN | 113545639 | A | 10/2021 |
| CN | 113645446 | A | 11/2021 |
| CN | 113674454 | A | 11/2021 |
| CN | 113706744 | A | 11/2021 |
| CN | 214835862 | U | 11/2021 |
| CN | 214886488 | U | 11/2021 |
| CN | 214943492 | U | 11/2021 |
| CN | 215169563 | U | 12/2021 |
| CN | 113947834 | A | 1/2022 |
| CN | 217240775 | U | 8/2022 |
| CN | 217307315 | U | 8/2022 |

(56) References Cited

FOREIGN PATENT DOCUMENTS

| | | | | | |
|---|---|---|---|---|---|
| CN | 115095246 | A | | 9/2022 | |
| CN | 115164381 | A | | 10/2022 | |
| CN | 115235096 | A | | 10/2022 | |
| CN | 115294675 | A | | 11/2022 | |
| CN | 115324428 | A | | 11/2022 | |
| CN | 115341821 | A | | 11/2022 | |
| CN | 115393988 | A | | 11/2022 | |
| CN | 218454661 | U | | 2/2023 | |
| CN | 115798084 | A | | 3/2023 | |
| CN | 116251221 | A | | 6/2023 | |
| CN | 219197192 | U | | 6/2023 | |
| CN | 219246122 | U | | 6/2023 | |
| CN | 116498183 | A | | 7/2023 | |
| CN | 116760602 | A | | 9/2023 | |
| CN | 116838214 | A | * | 10/2023 | |
| CN | 117238059 | A | | 12/2023 | |
| DE | 2702996 | A1 | | 8/1977 | |
| DE | 4430740 | A1 | * | 3/1996 | ............ E05F 15/624 |
| DE | 19964251 | A1 | | 4/2003 | |
| DE | 102018008812 | A1 | | 5/2020 | |
| DE | 202022101334 | U1 | | 5/2022 | |
| EP | 1944446 | A2 | | 7/2008 | |
| EP | 2692975 | A2 | * | 2/2014 | ............ E05F 15/624 |
| EP | 2728091 | A2 | | 5/2014 | |
| EP | 3118405 | A1 | | 1/2017 | |
| EP | 3502391 | A2 | * | 6/2019 | .............. E05F 15/60 |
| EP | 3537398 | A1 | | 9/2019 | |
| EP | 3845729 | A1 | | 7/2021 | |
| FR | 2937998 | A1 | * | 5/2010 | ............ E05F 15/624 |
| FR | 3132160 | A3 | | 7/2023 | |
| GB | 1362194 | A | | 7/1974 | |
| GB | 2259547 | A | * | 3/1993 | ............ E05F 15/624 |
| IN | 201921017138 | A | | 5/2019 | |
| IN | 201911049967 | A | | 12/2019 | |
| IN | 201911048995 | A | | 5/2021 | |
| IN | 202111053824 | A | | 12/2021 | |
| IN | 202241020116 | A | | 4/2022 | |
| IN | 202241026843 | A | | 5/2022 | |
| IN | 411059 | B | | 11/2022 | |
| IN | 202111013824 | A | | 12/2022 | |
| IN | 430120 | B | | 4/2023 | |
| IN | 202341019331 | A | | 4/2023 | |
| JP | 2013107733 | A | | 6/2013 | |
| JP | 6680821 | B2 | | 3/2020 | |
| JP | 2020042440 | A | | 3/2020 | |
| JP | 6777955 | B2 | | 10/2020 | |
| KR | 200311370 | Y1 | | 4/2003 | |
| KR | 20160025226 | A | | 3/2016 | |
| KR | 20160050965 | A | | 5/2016 | |
| KR | 20160123639 | A | | 10/2016 | |
| KR | 20160124481 | A | | 10/2016 | |
| KR | 101800514 | B1 | | 12/2017 | |
| KR | 20180029373 | A | | 3/2018 | |
| KR | 101841357 | B1 | | 5/2018 | |
| KR | 20180076537 | A | | 7/2018 | |
| KR | 20180131716 | A | | 12/2018 | |
| KR | 101988851 | B1 | | 6/2019 | |
| KR | 20190098719 | A | | 8/2019 | |
| KR | 20190098720 | A | | 8/2019 | |
| KR | 102024754 | B1 | | 9/2019 | |
| KR | 102079532 | B1 | | 2/2020 | |
| KR | 102150642 | B1 | | 9/2020 | |
| KR | 20200143302 | A | | 12/2020 | |
| KR | 20210004253 | A | | 1/2021 | |
| KR | 20210016726 | A | | 2/2021 | |
| KR | 20210019211 | A | | 2/2021 | |
| KR | 20210019216 | A | | 2/2021 | |
| KR | 20210019218 | A | | 2/2021 | |
| KR | 20210019241 | A | | 2/2021 | |
| KR | 20210045195 | A | | 4/2021 | |
| KR | 20210072510 | A | | 6/2021 | |
| KR | 20210078199 | A | | 6/2021 | |
| KR | 102303254 | B1 | | 9/2021 | |
| KR | 102329035 | B1 | | 11/2021 | |
| KR | 102341883 | B1 | | 12/2021 | |
| KR | 20210153308 | A | | 12/2021 | |
| KR | 20220031428 | A | | 3/2022 | |
| KR | 102421708 | B1 | | 7/2022 | |
| KR | 20220113136 | A | | 8/2022 | |
| KR | 20220119878 | A | | 8/2022 | |
| KR | 102472384 | B1 | | 12/2022 | |
| KR | 102534826 | B1 | | 5/2023 | |
| TW | M627626 | U | | 6/2022 | |
| WO | 2013163124 | A1 | | 10/2013 | |
| WO | 2016032464 | A1 | | 3/2016 | |
| WO | 2016175910 | A1 | | 11/2016 | |
| WO | 2017024088 | A1 | | 2/2017 | |
| WO | 2018184450 | A1 | | 10/2018 | |
| WO | 2018184452 | A1 | | 10/2018 | |
| WO | 2018184453 | A1 | | 10/2018 | |
| WO | 2018184454 | A1 | | 10/2018 | |
| WO | WO2018200726 | A1 | | 11/2018 | |
| WO | WO-2019068021 | A1 | * | 4/2019 | ......... E05B 47/0012 |
| WO | 2019162435 | A1 | | 8/2019 | |
| WO | WO2019191606 | A1 | | 10/2019 | |
| WO | 2020083594 | A1 | | 4/2020 | |
| WO | 2021089802 | A1 | | 5/2021 | |
| WO | 2022004989 | A1 | | 1/2022 | |
| WO | 2022010071 | A1 | | 1/2022 | |
| WO | 2022010072 | A1 | | 1/2022 | |
| WO | 2022010073 | A1 | | 1/2022 | |
| WO | 2022010074 | A1 | | 1/2022 | |
| WO | 2022020893 | A1 | | 2/2022 | |
| WO | 2022145966 | A1 | | 7/2022 | |
| WO | 2022263147 | A1 | | 12/2022 | |
| WO | 2023180427 | A1 | | 9/2023 | |

OTHER PUBLICATIONS

International Search Report and Written Opinion for International Application No. PCT/US2018/029443; International Filing Date Apr. 25, 2018; Report Mail Date Jul. 27, 2018 (10 Pages).

* cited by examiner

DOOR POSITIONING SYSTEM

CROSS-REFERENCE TO RELATED APPLICATIONS

This present application is a continuation of U.S. patent application Ser. No. 17/522,147 filed on Nov. 9, 2021, now U.S. Pat. No. 11,655,622, which is a continuation of U.S. patent application Ser. No. 16/359,780 filed on Mar. 20, 2019, now U.S. Pat. No. 11,174,664, which claim priority of U.S Provisional Application No. 62/645,499 filed Mar. 20, 2018 and U.S. Provisional Application No. 62/645,515 filed Mar. 20, 2018. All applications in this paragraph are incorporated herein by reference in their entirety, for any purpose, and to which priority is claimed.

BACKGROUND

For some people, physically closing interior doors in the home all the time or even every night may not be appealing or may be burdensome. In regards to fire safety, a closed door may greatly reduce the spread of fire and smoke. This can save lives, limit damage, and in some cases even help suppress the fire. In other situations, such as a non-emergency event, it may be desirable for a door closing device to be remotely operated to open or dose a door in response to a signal. There exists a need for an apparatus, system, and methods that open or close a door when triggered by an input, for example, a built-in smoke detector, an audio trigger from a smoke detector, a wireless signal from a home protection system, or a manual button by a user.

BRIEF SUMMARY

In some examples, an apparatus may include a baseplate configured to be coupled to a bottom portion of a door, the door configured to be positioned in an open door position, a closed door position, and a plurality of door positions in between the open position and closed position; a motor; circuitry electrically coupled to the motor and configured to be in communication with a remote computing device; at least one proximity sensor electrically coupled to the circuitry and configured to determine the door position with respect to a door frame; a drive wheel coupled to the motor and the circuitry, the drive wheel including an external surface, the external surface of the drive wheel configured to rotatably contact a ground surface; and wherein the motor is configured to be remotely activated by the remote computing device to engage the drive wheel to rotatably contact the ground surface to reposition the door responsive to receipt of a signal.

In some examples, the motor may be configured to harvest energy from motion of the door.

In some examples, the apparatus may include a latching doorknob including: a doorknob motor; doorknob circuitry electrically coupled to the doorknob motor and configured to be remotely connected to the remote computing device; a power transmission assembly coupled to the doorknob motor and configured to translate a rotational movement of the doorknob motor to a linear movement of a latch mechanism responsive to receipt of the signal.

In some examples, the latch mechanism may include a latch with a first end and a second end, and a latch housing with a hollow central portion and a first end formed by a plate with an aperture connected to the hollow central portion; wherein the power transmission assembly is coupled to the second end of the latch; wherein in response to the receipt of the signal, the power transmission assembly is configured to horizontally translate the latch within the hollow central portion of the latch housing and the first end of the latch is positioned within the aperture of the plate or within the hollow central portion of the latch housing; and wherein the latch mechanism is configured to be coupled to a first doorknob and a second doorknob.

In some examples, the drive wheel may be configured to accommodate combinations of doors and types of floor.

In some examples, the apparatus may further include a second motor coupled to a brake, the second motor configured to move the brake into an engaged position to prevent rotational movement of the drive wheel, and the second motor is configured to be remotely activated by the remote computing device responsive to receipt of the signal.

In some examples, the apparatus may be configured to receive the signal from at least one of the following: a smoke detector, a temperature detector, a carbon monoxide detector, a home alarm system, a mobile device, or a smarthome hub.

In some examples, the apparatus may include a gearbox coupling the motor and the drive wheel, wherein the drive wheel is directly coupled to an output shaft of the gearbox.

In some examples, the apparatus may include a receiver configured to receive the signal and a processor configured, responsive to the signal, to trigger the motor to move the door into the closed door position.

In some examples, the apparatus may include a bracket biasedly coupled to the baseplate, the motor and drive wheel coupled to the bracket, and wherein the biased coupling of the bracket to the baseplate is configured to adjust a vertical position of the drive wheel with respect to the baseplate.

In some examples, the apparatus may include a bracket configured to be coupled to the bottom portion of the door and biasedly coupled to the baseplate, the motor and drive wheel coupled to the baseplate, and wherein the biased coupling of the bracket to the baseplate is configured to adjust a vertical position of the drive wheel with respect to the bracket.

In some examples, the apparatus may include a speaker electrically coupled to the circuitry and configured to produce an audio signal responsive to receipt of the signal.

In some examples, the apparatus includes an LED electrically coupled to the circuitry and configured to produce a visual signal visible on an exterior of the apparatus responsive to receipt of the signal.

In some examples, the apparatus may include a manual override button electrically coupled to the circuitry and configured to override the remote activation of the motor responsive to receipt of the signal.

In some examples, the apparatus may include a first doorknob; a second doorknob; a latch mechanism coupling the first doorknob and the second doorknob; a doorknob motor; doorknob circuitry electrically coupled to the doorknob motor and configured to be in communication with a remote computing device, wherein the doorknob motor is configured to be remotely activated by the remote computing device responsive to receipt of a signal; and a power transmission assembly coupled to the doorknob motor and configured to translate a rotational movement of the doorknob motor responsive to receipt of the signal to a linear movement of the latch mechanism; the apparatus configured to be coupled to a door, with the first doorknob positioned on an interior side or exterior side of the door, and the second doorknob positioned on the other of the interior side or exterior side of the door, and the latch mechanism extending through a portion of the door between the interior side and exterior side of the door.

In some examples, the power transmission assembly may further include a driver gear coupled to the doorknob motor and a gear rack coupled to the latch mechanism.

In some examples, the latch mechanism may include a latch with a first end and a second end, and a latch housing with a hollow central portion and a first end formed by a plate with an aperture connected to the hollow central portion; wherein the power transmission assembly is coupled to the second end of the latch; wherein in response to the receipt of the signal, the power transmission assembly is configured to horizontally translate the latch within the hollow central portion of the latch housing and the first end of the latch is positioned within the aperture of the plate or within the hollow central portion of the latch housing.

In some examples, an apparatus may include a door positioning device including a baseplate configured to be a coupled to the door; a motor; circuitry electrically coupled to the motor and configured to be in communication with the remote computing device; at least one proximity sensor electrically coupled to the circuitry and configured to determine a door position upon the receipt of the signal; a drive wheel coupled to the motor and the circuitry; and wherein the motor is configured to be remotely activated by the remote computing device to engage the drive wheel to reposition the door responsive to receipt of the signal.

In some examples, an apparatus may include a door positioning device including a baseplate configured to be coupled to a bottom portion of a door, the door configured to be positioned in an open door position, a closed door position, and a plurality of door positions in between the open position and closed position; a motor; circuitry electrically coupled to the motor and configured to be in communication with a remote computing device; at least one proximity sensor electrically coupled to the circuitry and configured to determine the door position; and a drive wheel coupled to the motor and the circuitry, the drive wheel including an external surface, the external surface of the drive wheel configured to contact a ground surface; a latching doorknob including a doorknob motor; a doorknob circuitry electrically coupled to the doorknob motor and configured to be communication with the remote computing device; a power transmission assembly coupled to the doorknob motor and configured to translate a rotational movement of the doorknob motor to a linear movement of a latch mechanism responsive to receipt of a signal; wherein the doorknob motor is configured to be remotely activated by the remote computing device to engage the power transmission assembly responsive to receipt of the signal to disengage the latch mechanism from a door frame; and wherein the motor is configured to be remotely activated by the remote computing device to engage the drive wheel to rotatably contact the ground surface to reposition the door responsive to receipt of the signal and after the latch mechanism is confirmed to be disengaged from the door frame.

In some examples, the latch mechanism may be configured to be coupled to a first doorknob and a second doorknob.

This Summary is provided to introduce a selection of concepts in a simplified form that are further described below in the Detailed Description. This Summary is not intended to identify key features or essential features of the claimed subject matter, nor is it to be used to limit the scope of the claimed subject matter. A more extensive presentation of features, details, utilities, and advantages of the present disclosure as defined in the claims is provided in the following written description of various embodiments of the disclosure and illustrated in the accompanying drawings.

BRIEF DESCRIPTION OF THE DRAWINGS

The images which accompany the written portion of this specification illustrate examples and methods of use for the present disclosure according to the teachings of the present disclosure.

DETAILED DESCRIPTION

Various examples of a system for opening and/or closing a door in response to a remote signal are disclosed herein. In accordance with examples herein, a system for opening or closing a door in response to a receipt of a signal may include an apparatus coupled to a door having the capability to move or alter a position of the door, and a control system that may be used to receive a remote signal to move or alter the position of the door and send a signal to the apparatus to move or alter the position or the door. In some examples, the apparatus and control system are electrically connected. Remote signals and/or remote computing devices described herein generally includes signals which may be generated at a location other than the door to be activated by the signal and/or computing devices which are not mounted to or mechanically connected to the door. In some examples, the remote signals may be generated at and/or the remote computing devices may be located at a location which is in the room associated with the door, in the building associated with the door, outside the building associated with the door, and/or at a location other than the door which is in wired or wireless electronic communication with a device on the door.

Figure 1:
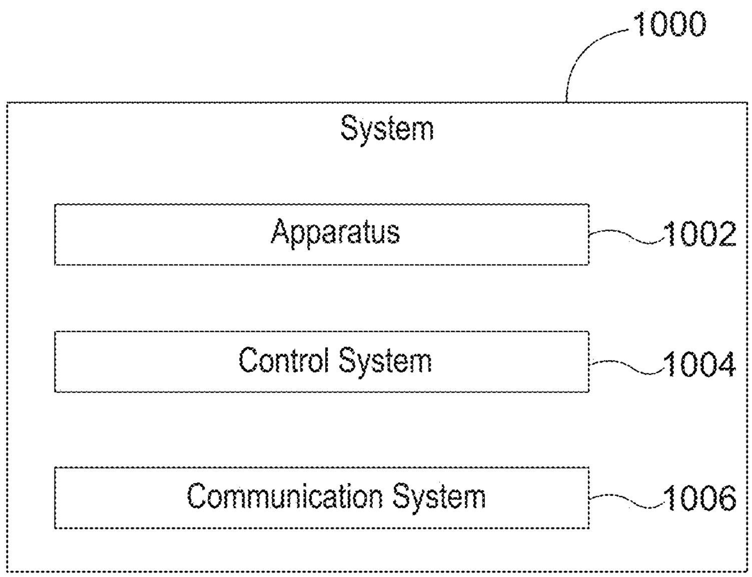
FIG. 1 is a system in accordance with an embodiment of a door positioning device.

FIG. 1 is a system in accordance with an embodiment of a door positioning system.

In accordance with examples herein, the system 1000 for closing a door in response to a receipt of a signal may include an apparatus 1002 coupled to a door having the capability to move or alter a position of the door, and a control system 1004 that may be used to receive a remote signal to move or alter the position of the door and send or communicate a signal to the apparatus to move or alter the position or the door. In some examples, the apparatus 1002 and control system 1004 are electrically connected. In some examples, the control system 1004 includes a receiver to receive the remote signal and a processor to trigger a motor of a power transmission assembly of 1002 to move the door into the closed door position. In some examples, the control system 1004 includes a receiver to receive the remote signal and a processor to trigger a motor of a power transmission assembly of 1002 to open a latch of a doorknob and trigger a motor of a power transmission assembly to move the door into an open position.

In some examples, the system 1000 may include a communication system 1006 that may be used to communicate various information with and about the apparatus 1002 and control system 1004. In some examples, the communication system 1006 is electrically connected to the apparatus 1002 and the control system 1004. In some examples, this communicated information may include a status of the apparatus 1002, a positional status of the door such as if the door is in an open position or a closed position, a status of the control system 1004 communicates a signal to the control system 1004, receives a communication or a signal from the control system 1004, etc.

In some examples, the system includes an apparatus, such as a door-mounted smarthome door position control device that controls the movement (opening or closing) of or repositions the door by a drive wheel that contacts the floor or ground surface and is controlled by a motor. The device may be controlled by an application ("app"), such as a program that can run on a remote computing device, such as a computer, smartphone, tablet, or other computing device or via a dedicated remote control that, in some examples, may share similar characteristics as garage door controllers. In some examples, the device is mounted to the interior of an inswing door with the drive wheel at the free-swinging end of the door.

In some examples, location and proximity sensing may be used in the door positioning system. This function may use GPS, cellular signals, Bluetooth, NFC, wifi or similar wireless communication protocol or a combination of them. In some examples, the user may elect to automatically have doors close or close and lock when they leave the immediate area of the house with their phone or tablet or remote computing device. In some examples, doors could be programmed to unlock and open when the user returns to the immediate area enhancing security and convenience.

In some examples, the door positioning system may be used in conjunction with other smarthome devices via a smarthome hub using "if this then that" (IFTTT) controls (or other protocol controls in other examples) to provide as many different specific options as the user may wish to program. For example, door position can have benefits to home security and safety in the case of fire, earthquake or other events. Connecting the door position control device to a home automation system or IFTTT hub may help provide a variety of options including, but not limited to: closing the door when the smoke detectors are activated to slow fire growth, engaging door stops to hinder access into the home in the event of suspicion activity captured by a home security system, or opening and closing doors to better enable movement by a person with a disability. In some examples, the ability to control the position of doors can provide other benefits related to energy consumptions and savings—for example ensuring exterior doors are closed when air conditioning systems are engaged.

Examples of systems for opening and or closing a door in response to a signal are described herein.

Figure 2:
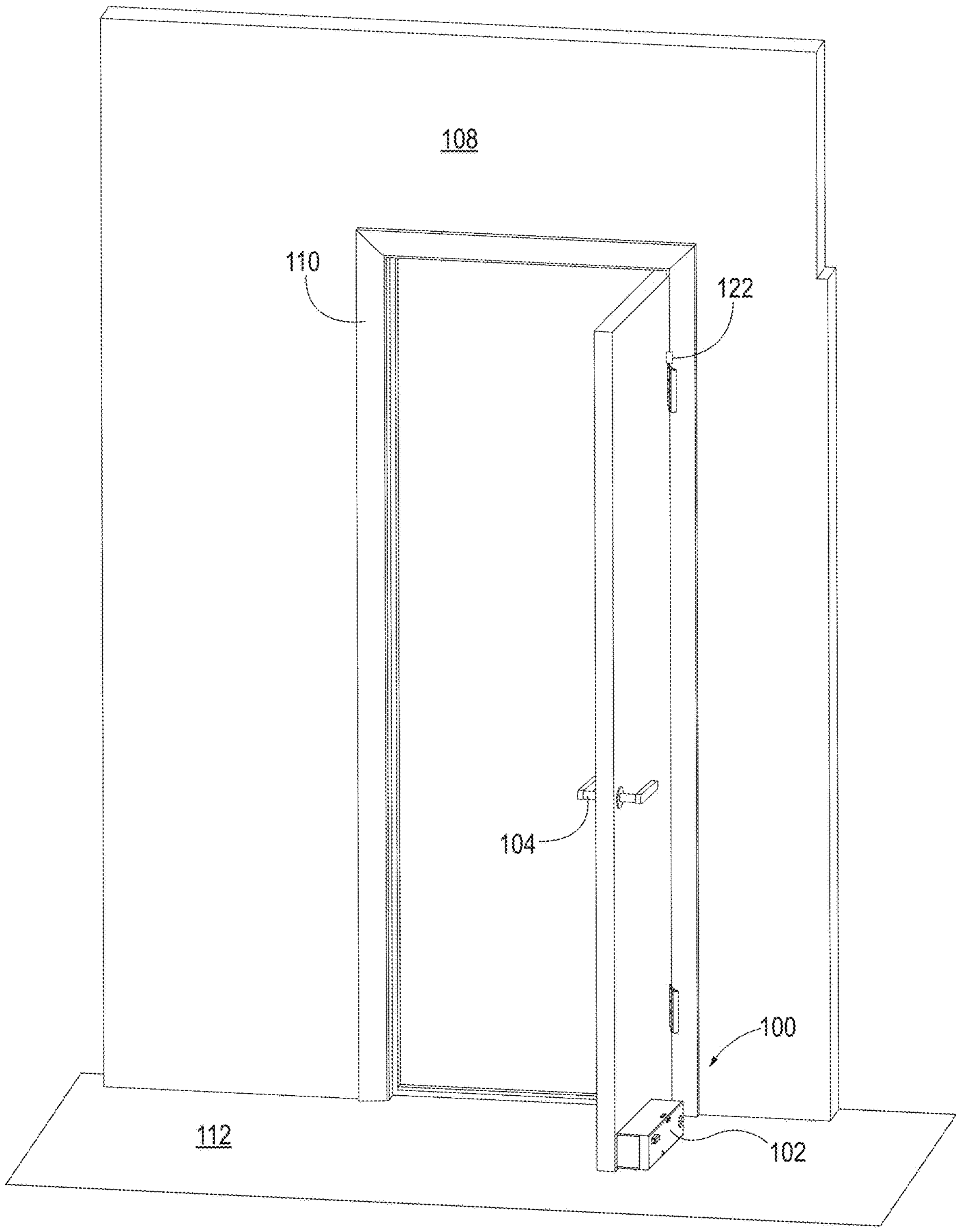
FIG. 2 is a perspective view of an example door positioning system, in accordance with the present disclosure in combination with a door member, a door frame, and a floor.

FIG. 2 is a perspective view of an example door positioning system 100, in accordance with the present disclosure, in combination with a door 106, a wall 108, a frame 110, and a floor or ground surface 112. In some examples, the door positioning system 100 may include a door positioning device 102. In some examples, the door positioning system 100 may include a doorknob 104. In some examples, the door positioning system 100 includes both door positioning device 102 and doorknob 104. In some examples, the door positioning device 102 is permanently or temporarily coupled to a bottom portion of the door 106.

Figure 3:
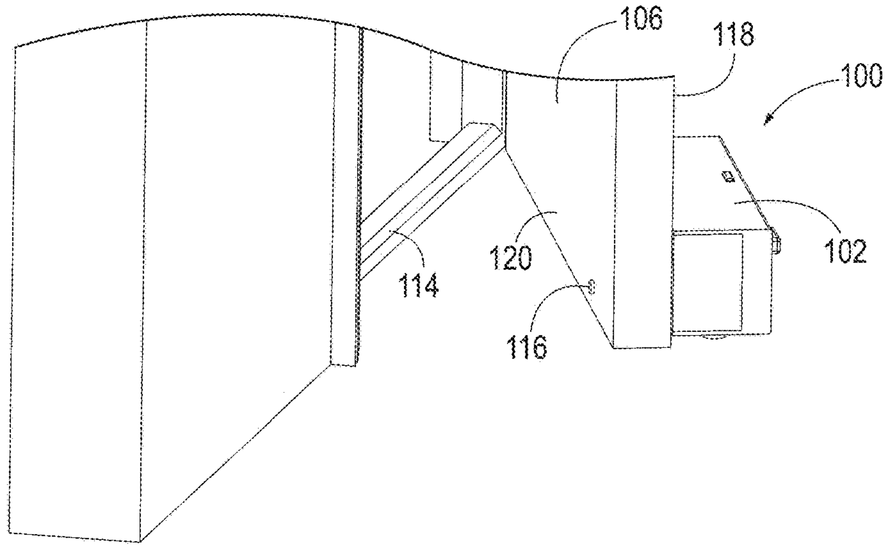
FIG. 3 is a perspective view of an example door positioning system in accordance with the present disclosure in combination with a door member, a door frame, and a floor.

FIG. 3 is a perspective view of an example door positioning system in accordance with the present disclosure in combination with a door 106, a frame 110, and a floor 112. The frame 110 may include a door sill 114. In some examples, the door 106 includes a proximity sensor cutout 116, which includes a hole or channel that extends through a width of the door, from an interior side 118 to an exterior side 120. The door positioning system 100 may include the door positioning device 102 fixedly or adjustably mounted on the interior side 118 or the exterior side 120 of the door 106. In examples where the door positioning device 102 is positioned or mounted on the interior side 118, a proximity sensor may be inserted at least partially through the proximity sensor cutout 116 and the door positioning device 102 may monitor the position of the door 106 using the proximity sensor's reading of proximity to the door sill 114. For example, an indication of the proximity of the door positioning device 102 to the door sill 114 based upon, in some examples, the proximity sensor's reading of proximity to the door sill 114 may cause the door positioning device 102 to engage to move the door or trigger the door positioning device 102 to engage to cease movement of the door. The proximity sensor's reading of the door sill proximity may also be communicated and used by other apparatus of the system, such as a doorknob 900. For example, if a remote signal is received by the system to open the door, if the proximity sensor indicates the door sill's proximity is within a range of distances that the system has predetermined to identify the door is closed, the system may then trigger a latch mechanism of the doorknob 900 to move the latch. Once the latch is moved, the door positioning device 102 may be engaged to open the door to move it away from the sill.

The door positioning system may include advantages over other door control devices, such as, but not limited to the ability to work with variety of door opening angles. Most existing door control devices are restricted to a certain opening angle or amount (for example 90 degree openers or 180 degree openers). The door positioning system can open and close a variety of angle doors without changing the design or components of the system. The system is not inherently restricted in range of travel like other door opening and closing devices. In use, a signal may be sent from the remote computing device and received by the door positioning device. Responsive to the signal, a power transmission assembly may be activated, and a main motor may to rotate and transmit power through a gearbox and a drive wheel. This may cause the drive wheel to rotate, either in a first or second direction, such as a forward or backward direction. An external surface of the drive wheel may continuously or intermittently contact the floor or ground while the drive wheel is rotating to facilitate movement of the door. The range of the door positon being altered or adjusted may be controlled via the remote device, so the door may be moved from being fully closed to partially open or fully open, and the door may be moved from being fully open to partially open or fully closed, etc. Unlike current closing devices, the door does not need to be either fully open or fully closed to operate or to cease operation.

Figure 4:
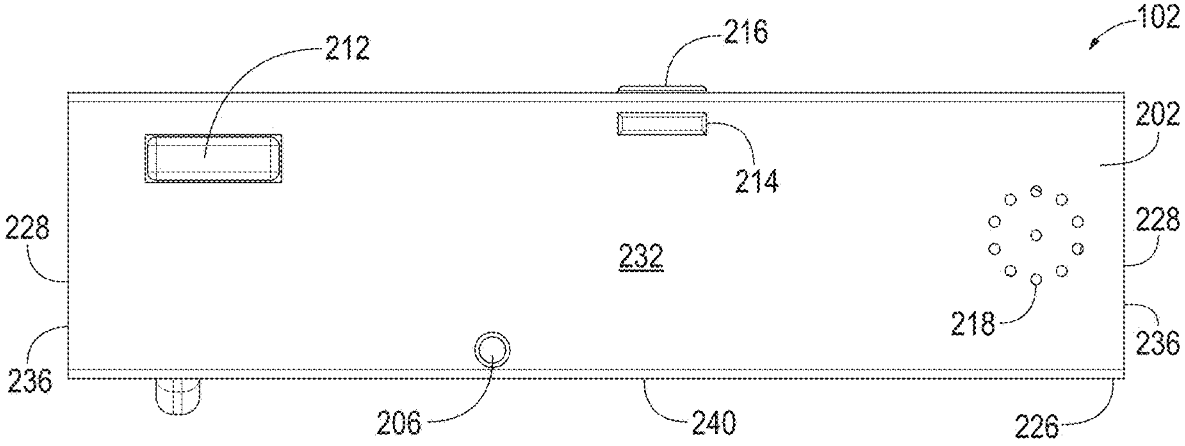
FIG. 4 is a perspective view of an example door positioning system in accordance with the present disclosure.
Figure 5:
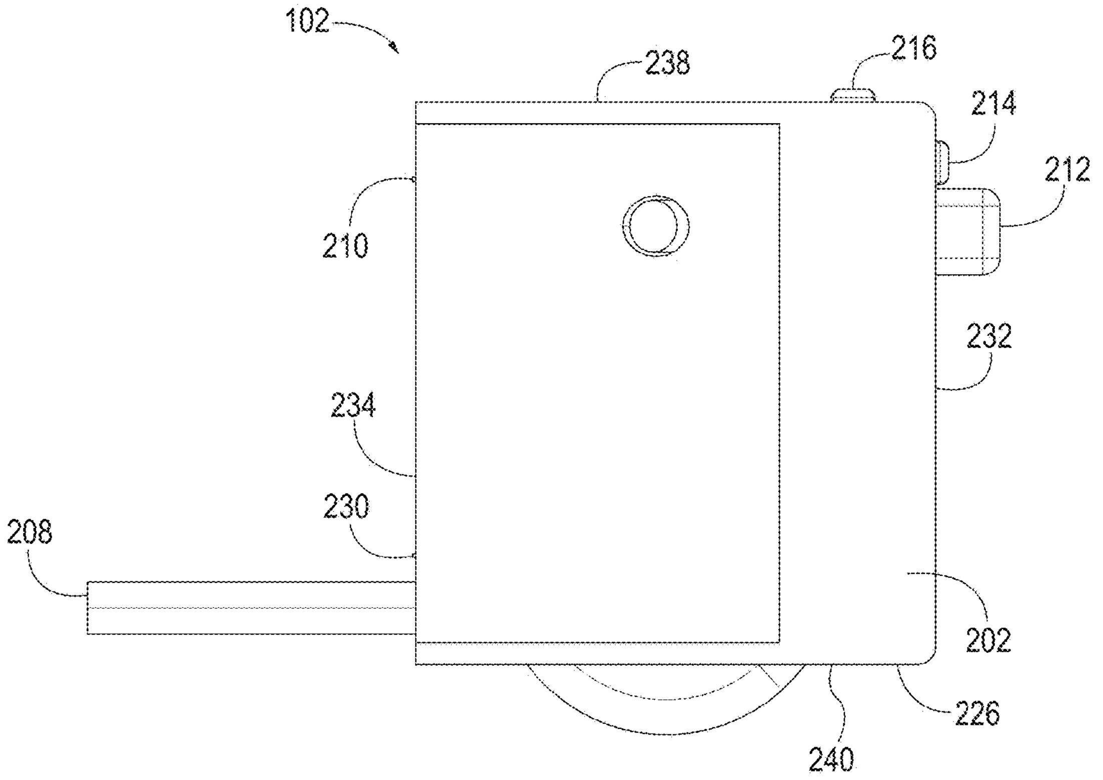
FIG. 5 is a side view of an example door positioning system in accordance with the present disclosure.

FIGS. 4 and 5 are a front and side view of an example door positioning system in accordance with the present disclosure. The door positioning system 100 may include a door positioning device 102. In some examples, the door positioning device 102 may be generally rectangular or box shaped, with a front side 232, a rear side 234, two vertical sides 236, a top side 238, and a bottom side 240. The door positioning device 102 may also include a first LED 214, positioned on or visible when viewed from the front side 232. A second LED 216 may be positioned on or visible when viewed from the top side 238. An open side proximity sensor 206 may be positioned to extend through the front side 232, in some examples near the lower edge 226. A speaker grill 218 may also be positioned on the front side 232, the speaker grill 218 including apertures that extend through the front side 232 to allow the produced audio signals from a speaker (see FIG. 6) to be heard better by users. A manual stop button 212 may also extend away from or through the front side 232. The door positioning device 102 may include a closed side proximity sensor 208 extending away from the rear side 234. A drive wheel 312 may extend away from the bottom side 240.

The door positioning device 102 may include a baseplate 210 and an enclosure cover 202. In some examples, the baseplate 210 forms the rear side 234, and a portion of each vertical side 236 of the door positioning device 102. In some examples, the enclosure cover 202 forms the top side 238, front side 232, and a portion of each vertical side 236 of the door positioning device 102. In some examples, the bottom side 240 may be not be a solid panel, and is instead formed by lower edge 226 that forms a border about the perimeter of the bottom side 240. In some examples, the bottom side 240 is a solid panel formed by either the baseplate 210 or the enclosure cover 202, or a combination of the bottom side 240 and enclosure cover 202 with a cutout aperture for the drive wheel 312 to extend beyond the bottom side 240.

Figure 6:
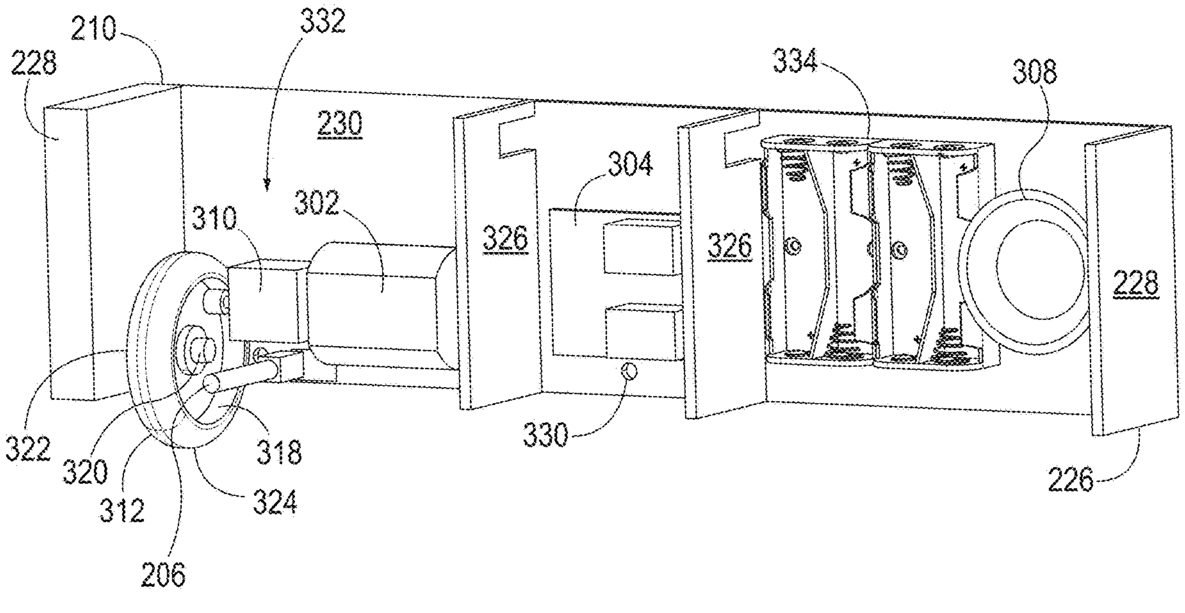
FIG. 6 is a perspective view of components of an example door positioning system in accordance with the present disclosure.

FIG. 6 is a perspective view of an example door positioning system in accordance with the present disclosure, with some features of FIG. 5, such as the enclosure cover 202, first LED 214, second LED 216, and manual stop button 212, hidden. The baseplate 210 may include a vertical rear panel 230, and two vertical base plate sides 228. In some examples, the two vertical baseplate sides 228 may be positioned normally to the rear panel 230. The baseplate 210 may also include at least one intermediate wall 326, positioned horizontally between the two vertical base plate sides 228. In some examples, the at least one intermediate wall 326 may be generally parallel to the baseplate side 228. The intermediate walls 326 may also include holes, cutouts or positioning features to allow for the various circuitry of the door positioning device 102 to be connected.

In some examples, the baseplate side 228 may include an axel seat 322, a hole that extends partially or fully through one of the base plate sides 228. A bearing may be positioned within the axel seat 322.

The baseplate 210 may include at least one mounting hole 330 extending through the rear panel 230, so that fasteners may extend through the holes to mount the baseplate 210 to the door 106. The rear panel 230 may also include an additional aperture or cutout to allow the closed side proximity sensor 208 to extend through the rear panel 230, and eventually through the door that the door positioning device 102 is coupled or connected to.

In some examples, the door positioning device 102 includes a power transmission assembly 332. The power transmission assembly 332 may include a main motor 302, a gearbox 310, and a drive wheel 312. In some examples, the main motor 302 is fixedly or adjustably mounted to the baseplate 210 and engages and turns the drive wheel 312. The main motor 302 may be coupled to the gearbox 310, such that the rotational output speed of the output shaft of the main motor 302 may be multiplied (sped up) or divided (slowed down). In some examples, the motor 302 and gearbox 310 are integrated into an integrated gearbox, in some examples with an offset output shaft, enhancing the compactness of the power transmission assembly. An output shaft 314 of the gearbox 310 may engage the drive wheel 312. In other examples, the output shaft of the main motor 302 may be coupled to the drive wheel 312 using a belt and pulley assembly, a synchronous belt assembly, a gear drive, a chain and tooth, a clutch, or other power transmission assemblies.

The power transmission assembly 332 may include the drive wheel 312, with an inner surface 318 and an external surface 324, and a drive wheel axel 320. In some examples, the inner surface 318 includes teeth, or a surface treatment to increase the coefficient of friction of the inner surface 318. In some examples, the output shaft 314 of the gearbox 310 engages the inner surface 318 of the drive wheel 312, such that the rotational motion of the output shaft 314 is transmitted to the drive wheel 312, this rotating the drive wheel 312. In some examples, the output shaft 314 also includes teeth to mesh or engage with the teeth on the inner surface 318. In some examples, the output shaft 314 includes a surface treatment to increase the coefficient of friction of the outside of the output shaft 314 to better or more efficiently engage with the inner surface 318 of the drive wheel 312 using a friction drive mechanism. In other examples, the output shaft 314 of the gearbox 310 may be coupled to the drive wheel 312 using a belt and pulley assembly, gear drive, chain and tooth or others. In some examples, the output shaft 314 may be directly coupled to the drive wheel. In use, the external surface 324 of the drive wheel may contact the floor 112 to facilitate movement or repositioning of the door 106. The external surface 324 of the wheel may include a tread or patterned surface, and/or be formed from a material with a high coefficient of friction, such as rubber, plastics, etc., to help the wheel engage with the floor without spinning or freewheeling.

In some examples, the door positioning device 102 includes a speaker 308. The speaker 308 may be positioned behind or near the speaker grill 218 (FIG. 4).

The door positioning device 102 may include a power source, such as a battery, or provide for hard wiring to an electrical source separate from the door positioning device 102 or door positioning system 100. In some examples, a battery bracket 334 is coupled or mounted to the baseplate 210. The battery bracket 334 may be positioned to be accessible to the user for changing batteries, battery packs or connecting a charging cable.

The door positioning device 102 also includes circuitry to electrically connect various components such as the open side proximity sensor 206, closed side proximity sensor 208, main motor 302, battery bracket 334, speaker 308, first LED 214, second 216, and the manual stop button 212. In some examples, the door positioning device 102 includes a PCBA 304 which includes the control circuit and wireless radio to allow it to interface to the remote computing device.

An enclosure covers the entire circuitry, batteries and mechanism. In some examples, an external cover contains openings to allow the wheel to contact the floor, LED lights to illuminate the door and surrounding area, a speaker grill and a manual stop button.

In some examples, the device may include energy harvesting, i.e., gathering, components. Energy harvesting (also known as power harvesting or energy scavenging or ambient power) is the process by which energy is derived from external sources (e.g., solar power, thermal energy, wind energy, salinity gradients, and kinetic energy, also known as ambient energy), gathered (or captured) and stored. For example, energy may be harvested, i.e., gathered, from the action of the user opening and/or closing the door manually.

During the motion of the door opening and/or closing, the drive wheel 312 travels along the floor or ground and turns via friction with the floor. This motion may turn the main motor 302 via the power transmission assembly 332 creating current which may be used to charge the batteries and/or store the energy in a capacitor. In this manner the circuitry components, such as the PCBA, can be configured to provide energy harvesting.

In some examples, the door positioning device includes the baseplate 210 fixedly or adjustably mounted to the lower portion of the door. When assembled, the drive wheel axel 320 may extend through the drive wheel 312 with an end positioned or extending through the axel seat 322 in the baseplate side 228 to help maintain alignment of the drive wheel axel 320 and the drive wheel 312. In use, a signal is sent from the remote computing device and received by the door positioning device 102. Responsive to the signal, the main motor 302 may rotate and transmit power through the gearbox 310 and to the drive wheel 312. This may cause the drive wheel 312 to rotate, either in a first or second direction, such as a forward or backward direction. In some examples, the output shaft of the gearbox may contact the inner surface 318 of the drive wheel 312 to rotate the wheel. The external surface 324 of the drive wheel 312 may continuously or intermittently contact the floor 112 while the drive wheel 312 is rotating to facilitate movement of the door 106.

In some examples, the proximity switches or sensors 206, 208 provide information about the position of certain components relative to each other. In some examples, when the door positioning device 102 is being operated or receives a signal from the remote computing device, the proximity sensors 206, 208 may be used to indicate when the door has reached the open and closed positions, and receipt of these signals may trigger the main motor 302 to stop, so that the drive wheel 312 stops rotating. In some examples, the main drive motor circuit, including the PCBA 304, may also use a peak load setting, such as may be similar to technology used in garage doors, to ensure the motor stops if the door experiences unacceptable force—either due to outside interference or some other issue. In some examples, the door positioning device includes a proximity sensor 208, positioned with an opening in the baseplate 210 and the door proximity sensor cutout 116 in the door, to indicate when the door is closed, for example, when the closed door is in contact with the jamb, threshold or sill and the proximity of the components activates the proximity sensor. In some examples, the open side proximity sensor 206 is directed in the opposite direction of the closed side proximity sensor 208, and the open side proximity sensor 206 may be used to detect when the door is close to, or to an extent it contacts, an adjacent wall or some other surface. Other positions of the proximity sensors may be used to achieve the same result.

In some examples, the door positioning device 102 uses the speaker 308, LED lighting 214, 216, or a combination of speaker and LED components to notify a user when the door 106 is going to move or provide audible and visual indicators to help locate the door in low visibility conditions or other circumstances when it would be helpful, such as a power loss at the home. In some examples, these indicators may be used to notify the users if there is a low battery or other electro-mechanical issue.

In some examples, the door positioning device 102 includes the manual stop button 212. In use, the manual stop button 212 may be desirable in the instance where if the door reaches the adjacent wall, door stop or other obstacle while opening, the manual stop button 212 will be depressed and stop the motion of the door. A user may also engage the manual stop button 212 to stop or manually override the operation of the door positioning device 102.

In some examples, the door positioning system 100 may include a hinge-mounted door position sensor or switch 122 that may also be used to monitor the position of the door and report it via a wireless signal. The information from such door switches could be used by the user or processed automatically by the remote computing device so the user can determine if the door is opened or closed and then elect to activate the door positioning device 102. In some examples, the door positioning system may also include the capability to operate in conjunction with home automation systems or devices that include the use of timers and automation actions. In some examples, a user may desire to ensure all doors are automatically closed in the evening if they are in the open position at a certain time of day. A door position switch may be used in conjunction with the door positioning system for this aspect.

Figure 7:
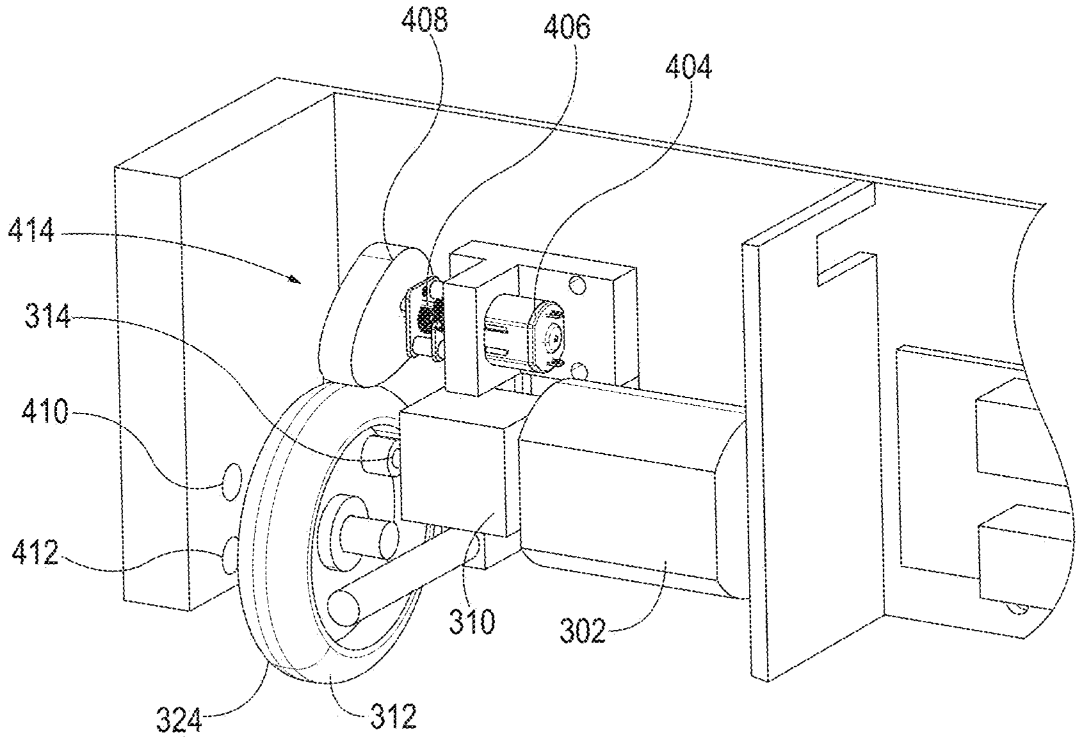
FIG. 7 is a perspective view of components of an example door positioning system in accordance with the present disclosure.
Figure 8:
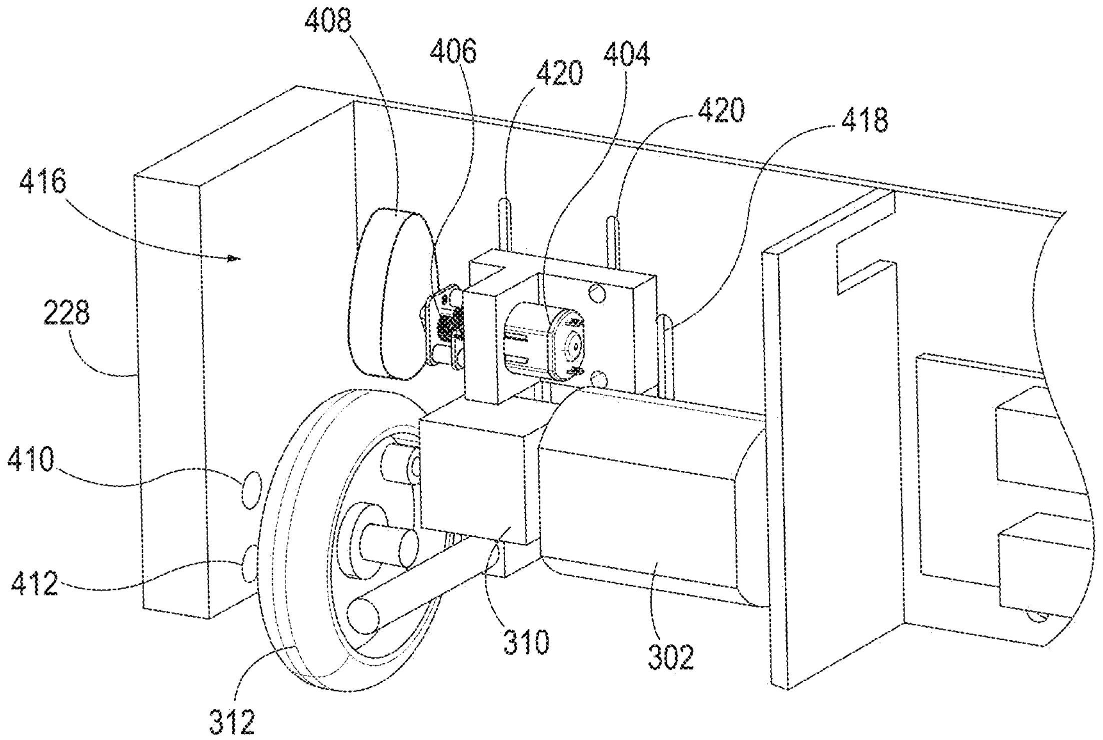
FIG. 8 is a perspective view of components of an example door positioning system in accordance with the present disclosure.

FIGS. 7 and 8 are perspective views of an example door positioning system 100 in accordance with the present disclosure. FIGS. 7 and 8 show a door positioning device 102 similar to that shown in FIG. 6, but FIGS. 7 and 8 include a brake assembly 402. The brake assembly 402 may include a brake motor 404 coupled to a gearbox 406 coupled to a brake 408. The brake assembly 402 may be electrically connected to the PCBA 304. The brake 408 may be oblong, egg-like, or cam-shaped, and an output shaft of the gearbox 406 coupled to the center of the brake 408 to allow rotation of the brake 408 while positioned adjacent to the baseplate 210. The brake 408 is positioned with respect to the drive wheel 312 so that in a brake-engaged position 414 as shown in FIG. 7, the brake 408 contacts the external surface 324 of the drive wheel 312. FIG. 8 shows the brake 408 in a brake disengaged position 416, so that the brake 408 does not contact or interfere with the external surface 324 of the drive wheel 312.

FIG. 8 also shows that, in some examples, the door positioning device 102 includes different mounting positions for the drive wheel axel 320. First alternate mounting location 410 and second alternate mounting location 412 are holes extending partially or fully through the baseplate side 228 so that the door positioning device 102 may be adjusted so the height of drive wheel 312 may accommodate different types of floor and door combinations. In some examples, the main motor 302 and gearbox 310 can be mounted to the baseplate 210 using slots 418 to allow height adjustment of the main motor 302 and gearbox 310 to help ensure the power transmission assembly 332 is aligned properly with the floor and the existing door and that the main motor 302 and gearbox 310 still properly engage the drive wheel 312. In some examples, the brake assembly 402 may be mounted to the baseplate 210 using slots 420 to allow for the height or position of the brake assembly 402 to be adjusted.

In use, the brake assembly 402 may be used as a door stop mode feature. By engaging the brake 408 on the drive wheel 312, the door positioning device 102 may act as a door stop. The brake 408 may be a secondary mechanism that helps create a physical stop to prevent the drive wheel 312 from turning or by affecting or energizing the main motor 302 in a way that restricts motion of the drive wheel. In some examples, the user can use the remote computing device, or specific features of an app or program on the remote computing device, to specify the door opening amount and then engage the door stop mode so that the brake motor 404 engages the gearbox 406 to rotate the brake 408 to contact the external surface 324 of the drive wheel 312. The contact between the brake 408 and the drive wheel 312 will help to hold the door in that position under normal and/or reasonable conditions.

Figure 9:
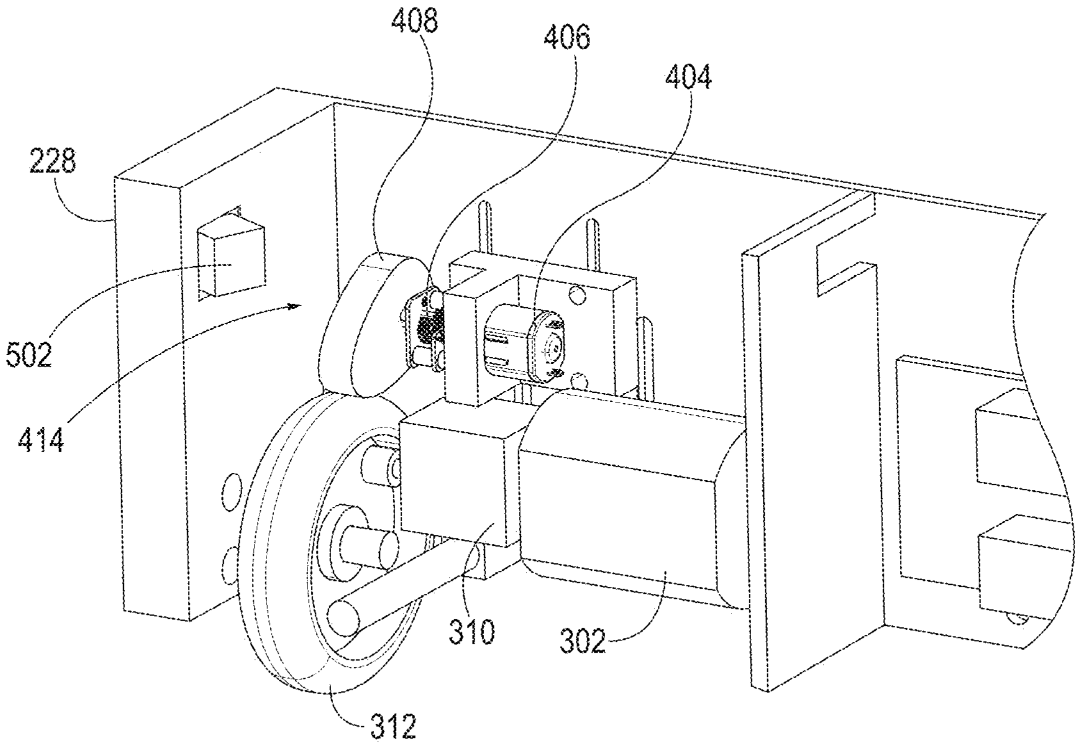
FIG. 9 is a perspective view of components of an example door positioning system in accordance with the present disclosure.
Figure 10:
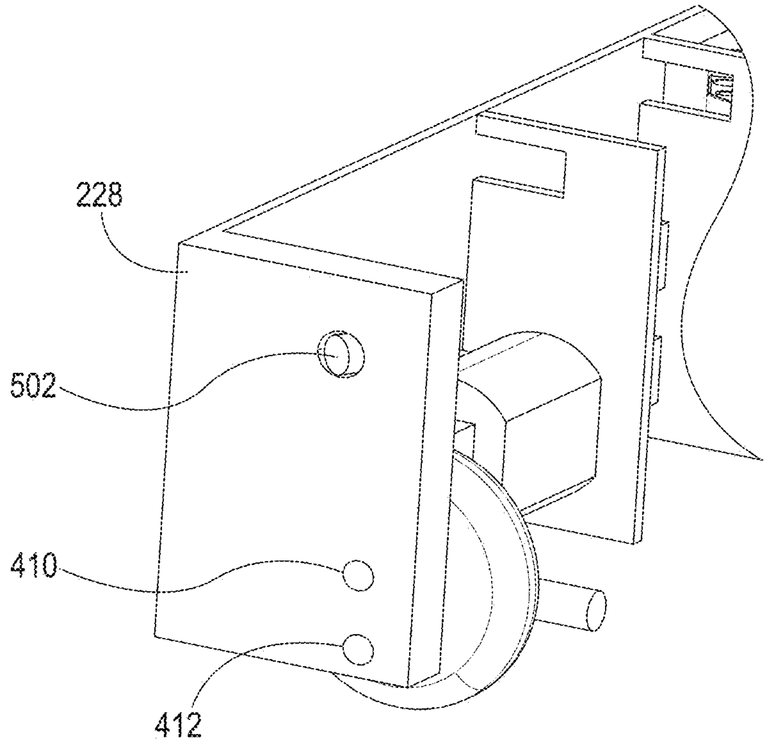
FIG. 10 is a perspective view of components of an example door positioning system in accordance with the present disclosure.

FIGS. 9 and 10 are perspective views of an example door positioning system in accordance with the present disclosure. FIGS. 9 and 10 are similar to FIGS. 7 and 8. FIGS. 9 and 10 also show a proximity sensor 502, positioned to extend through the baseplate side 228. The baseplate side 228 of FIGS. 9 and 10 may include an aperture or hole extending through the sidewall to accommodate the proximity sensor 502.

In use, the proximity sensor 502 may be angled with respect to the opening in the door frame and may be used within the door positioning device 102 of the door positioning system 100 to determine when the door is in a closed position, by sensing the door frame 110 or jamb or wall.

Figure 11:
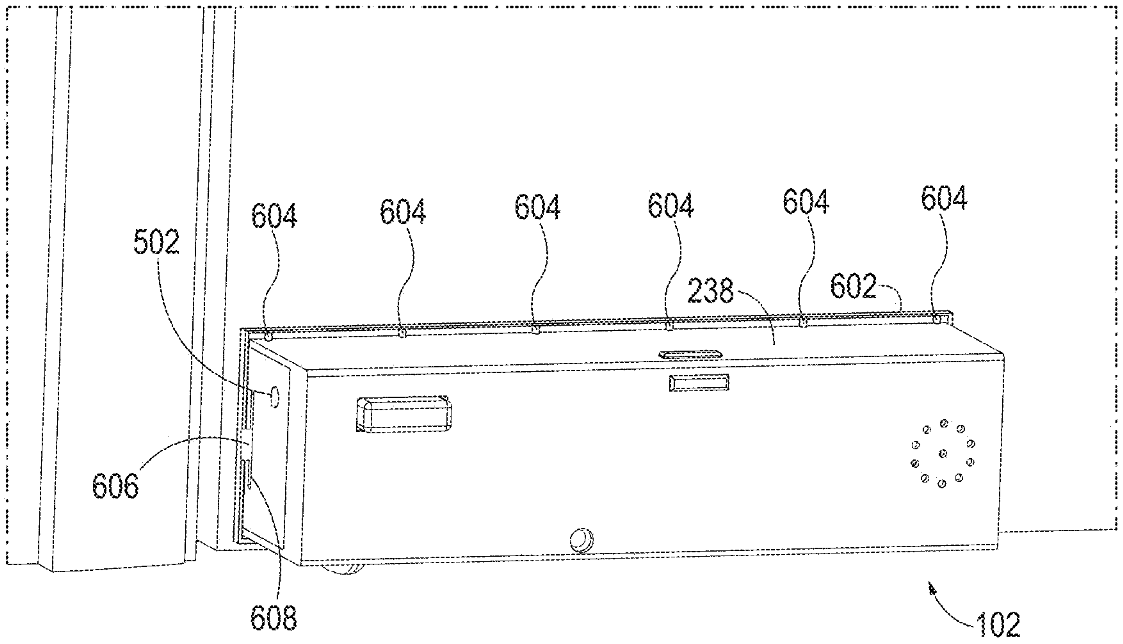
FIG. 11 is a perspective view of an example door positioning system in accordance with the present disclosure a door member, a door frame, and a floor.
Figure 12:
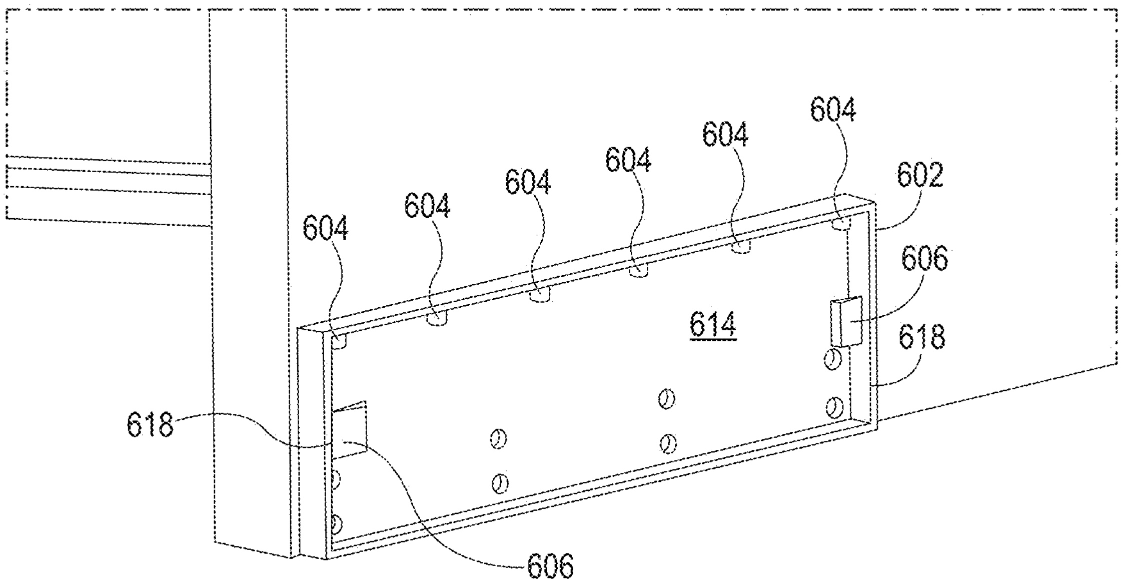
FIG. 12 is a perspective view of components of an example door positioning system in accordance with the present disclosure.

FIGS. 11 and 12 are perspective views of an example door positioning system in accordance with the present disclosure. The door positioning device 102 may also include a bracket 602 and biasing elements 604, i.e., spring elements, to form a spring-loaded slider bracket, as shown in FIG. 12. The bracket 602 may have a footprint that is larger than that of the baseplate 210. An outside border 612 of the bracket 602 may be raised to form a ridge that extends away from a main surface 614 of the bracket 602. The biasing elements 604 may be positioned within the border 612, along at least one edge, such as the upper edge 616 shown in FIGS. 11 and 12. The bracket 602 may also include tabs 606 that extend inward from the border 612 along the two sides 618. The tabs 606 may have a thickness that is smaller than that of the border 612, so that the tabs are cantilevered inward. The tabs 606 on the bracket 602 may engage with a mating slot 608 in the baseplate side 228 (see FIG. 11). The bracket 602 may also include mounting holes to allow for fasteners to extend through the bracket 602 to mount the bracket 602 to the door.

In use, the bracket 602 may be coupled to the door 106, with the baseplate 210 then adjustably coupled to the bracket 602. The tabs 606 on the bracket 602 may extend through the slot 608 on the baseplate 210, allowing the baseplate to slide up and down vertically with respect to the bracket 602. The biasing elements 604 may press down or engage with the top side 238 of the enclosure cover 202 so that the door positioning device 102 can flex upward or downward if needed to maintain contact with the floor. The use of the bracket 602 and biasing elements 604 in a door positioning device 102 may allow for imperfections in the door, wall or floor to not affect or prevent the door positioning device 102 from operating as desired and to help ensure the drive wheel is in substantially constant contact with and maintains pressure against the floor.

Figure 13:
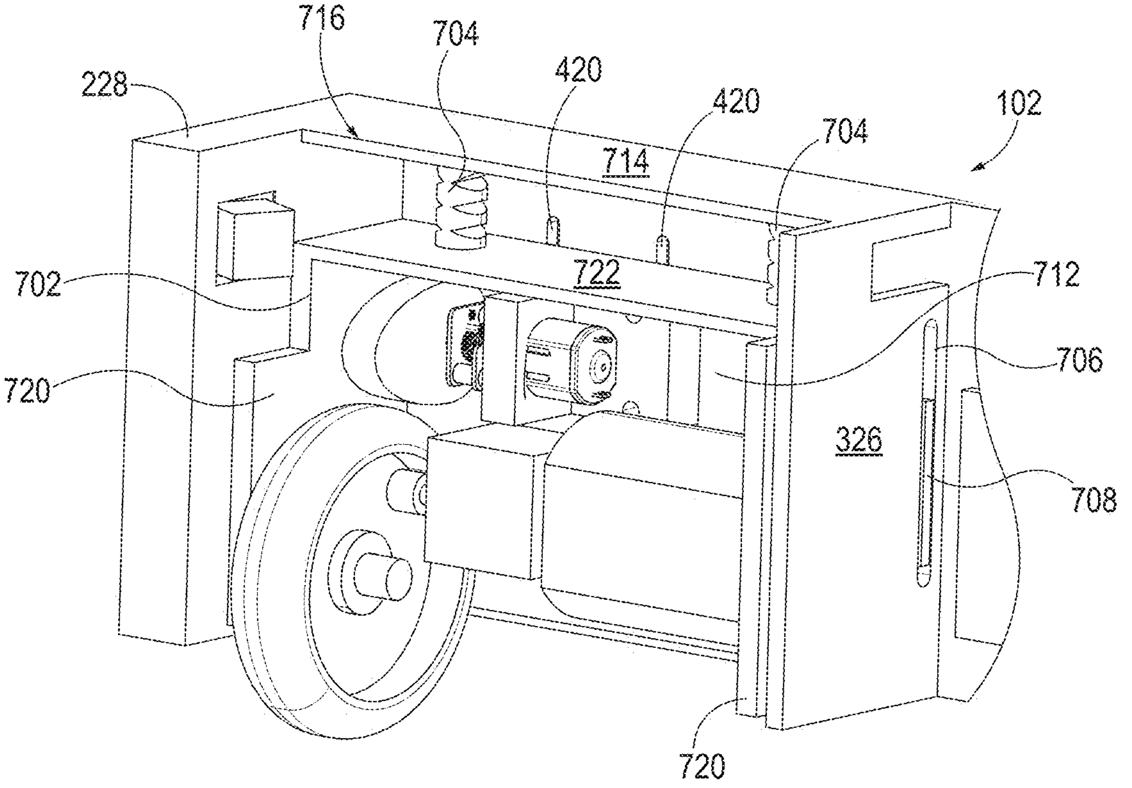
FIG. 13 is a perspective view of components of an example door positioning system in accordance with the present disclosure.
Figure 14:
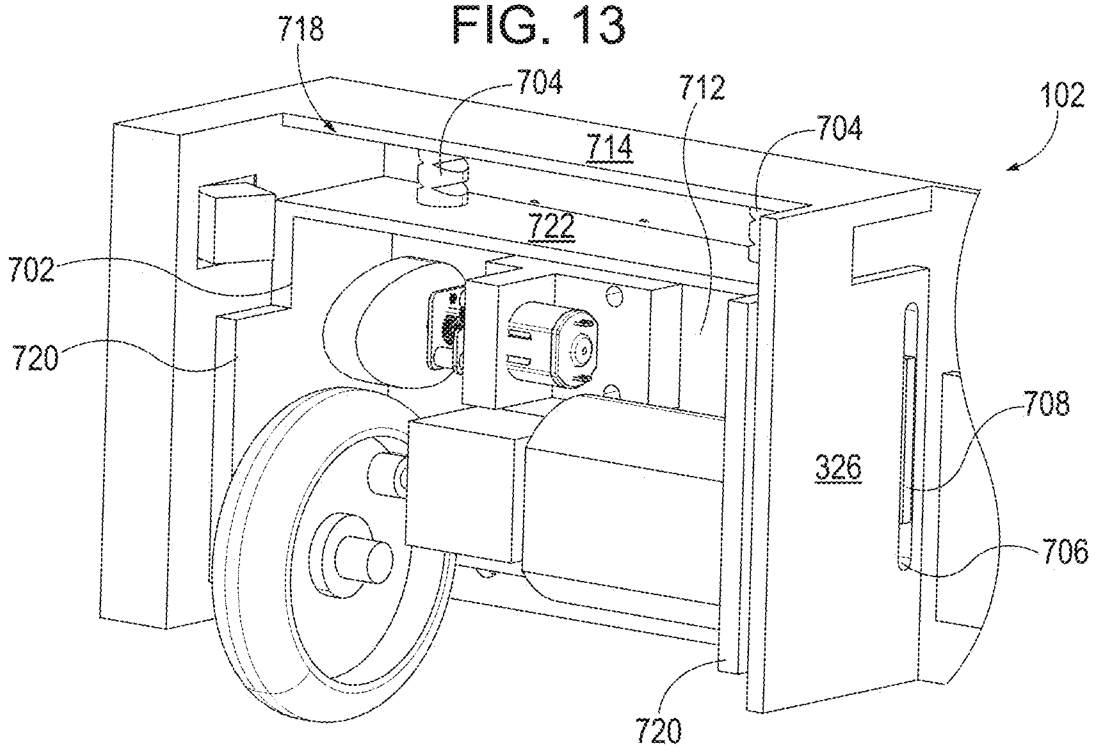
FIG. 14 is a perspective view of components of an example door positioning system in accordance with the present disclosure.

FIGS. 13 and 14 are perspective views of an example door positioning system in accordance with the present disclosure. FIGS. 13 and 14 may be similar to the door positioning device 102 of FIGS. 7 and 8. FIGS. 13 and 14 may also include an internal bracket 702 and biasing elements 704, i.e., spring elements. In some examples, the internal bracket 702 may be biasedly (i.e., elastically through the spring elements 704) coupled to the baseplate 210. The internal bracket 702 includes a main body 712, with a raised border formed by its upper edge 722 and sides 720. The upper edge 722 and sides 720 may be generally normal to the main body 712 of the internal bracket 702. The internal bracket 702 may include tabs 708 extending from either side 720. The tabs 708 may fit within a slot 706 formed in the intermediate wall 326 of the baseplate 210. The internal bracket 702 may also include an aperture in its side 720 to allow the drive wheel axel 320 to extend through it.

The baseplate 210 may also include an upper wall 714 that is generally parallel to the upper edge 722 of the internal bracket 702. When assembled, biasing elements 704 may be positioned between the upper edge 722 of the internal bracket 702 and the upper wall 714 of the baseplate 210. FIG. 13 shows the internal bracket 702 in an extended position 716. FIG. 14 shows the internal bracket 702 in a compressed position 718, with the biasing elements 704 compressed. When assembled, the internal bracket 702 may be positioned so that it fits between the baseplate side 228 and an intermediate wall 326.

In FIGS. 13 and 14, the power transmission assembly 332 is coupled to the internal bracket 702 and slidably coupled to the baseplate 210 via slots 420. This may differ from the power transmission assembly 332 being coupled to the baseplate 210 as shown in FIG. 8. As shown in FIG. 8, the slots 420 do allow for the height adjustment of the power transmission assembly 332, but the adjustment is static, such that the height of power transmission assembly 332 will not change as the door positioning device 102 is operated. In FIGS. 13 and 14, the height of the power transmission assembly 332 may be adjusted both statically (via the slots) and prior to operation of door positioning device 102, and dynamically (via the interaction of the internal bracket 702, the biasing element 704, and the slots 420) during the operation of the door positioning device 102.

In use, the door positioning device 102 including the internal bracket 702 allows that the relative height of the power transmission assembly 332 will dynamically adjust so that the drive wheel 312 can statically and dynamically accommodate, during the initial setup and during the operation of the door positioning device 102, different types of floor and door combinations. The power transmission assembly 332 may be mounted to the baseplate using slots to allow adjustment in positioning to help ensure the drive wheel and output shaft are correctly aligned when the drive wheel 312 contacts the floor. The power transmission assembly 332 is also mounted to a spring-biased internal bracket 702 so the power transmission assembly 332 can flex up or down as needed to maintain contact with the floor during installation or during operation of the door positioning device 102. The tab 708 extending from each side 720 of the internal bracket 702 engages with the slot 706 formed in the baseplate side 228 and intermediate wall 326 of the baseplate 210. The engagement of each tab 708 and slot 706 helps maintain alignment of the drive wheel axel 320 and the drive wheel 312 before and during operation and the height of the power transmission assembly 332 may change.

Figure 15:
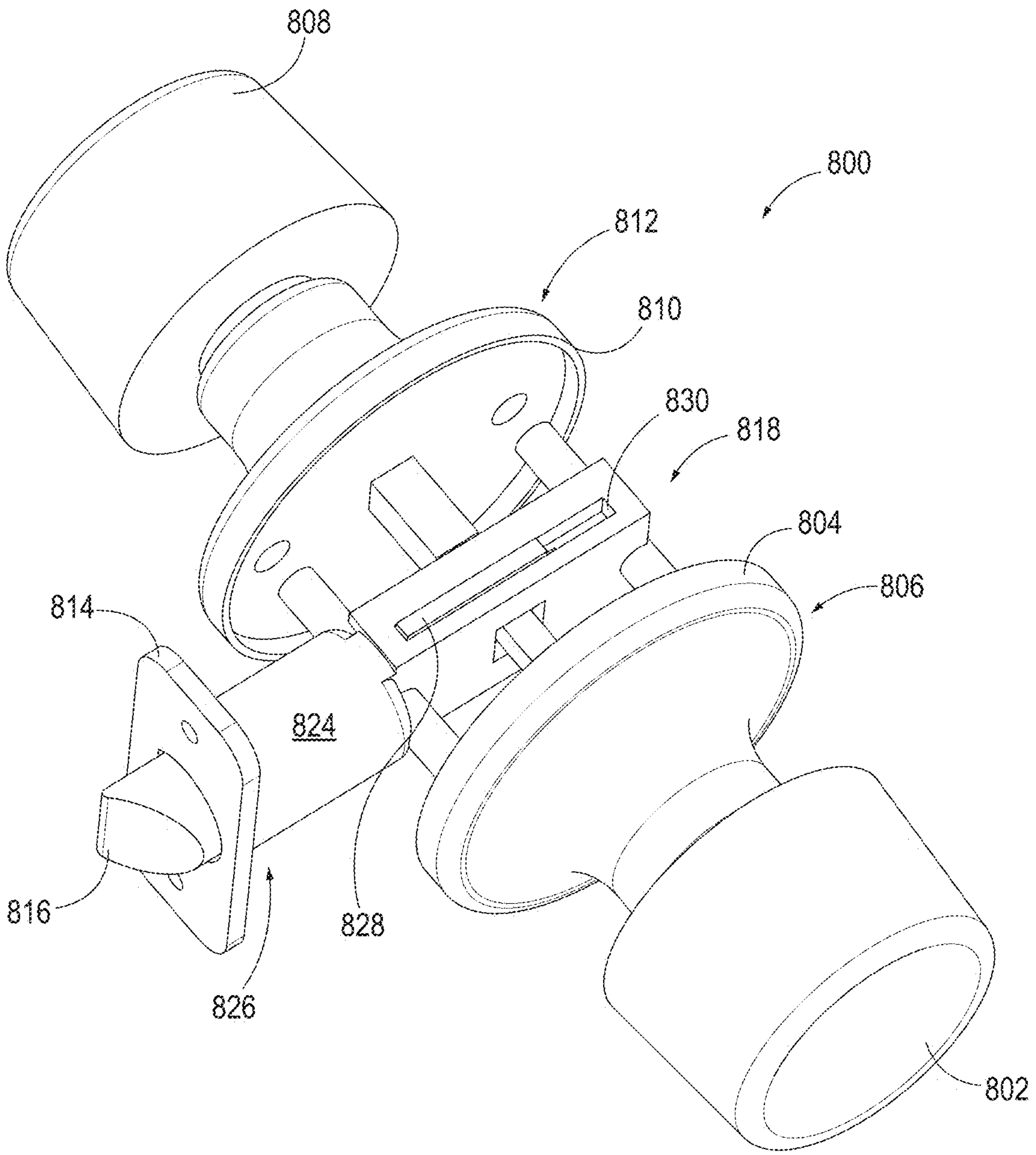
FIG. 15 is a perspective view of components of an example door positioning system in accordance with the present disclosure.
Figure 16:
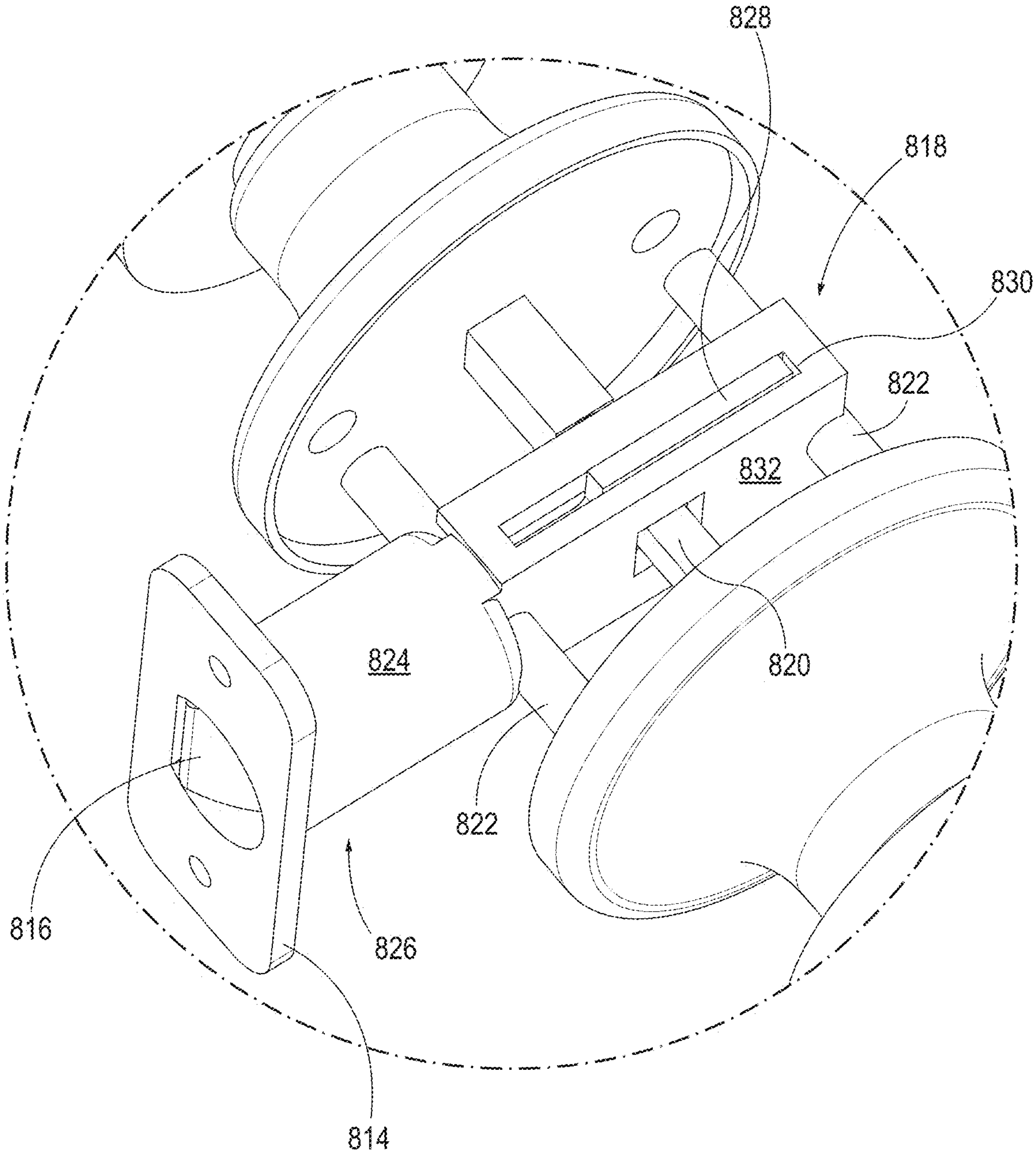
FIG. 16 is a perspective view of components of an example door positioning system in accordance with the present disclosure.

FIGS. 15-20 are various views of components of a door positioning system in accordance with the present disclosure. FIGS. 15 and 16 include a doorknob assembly 800, with a latch in an extended position (FIG. 15) and in a retracted position (FIG. 16). The doorknob assembly 800 includes a first handle 802, first handle rosette 804 including a spring assembly 806, a second handle 808, and a second handle rosette 810 including a spring assembly 812. The doorknob assembly 800 may also include a spindle 820 with two fasteners 822 extending from the first handle 802, each fastener 822 positioned on either side of the spindle 820. The fasteners 822 and spindle 820 may be coupled to a latch assembly 818, and the spindle 820 may also be coupled to the second handle 808.

The doorknob assembly 800 also includes the latch assembly 818, which includes a plate 814 positioned at an end of the latch assembly 818, the plate 814 connected to a latch housing 824 connected to a cage 832. The latch housing 824 includes a hollow central portion. A latch 816 is positioned within the latch housing 824 and the hollow central portion, with a spring assembly 826 and coupled to a transmission plate 828 positioned within the cage 832. A top portion of the transmission plate 828 extends through a slot 830 formed in the top of the cage 832.

In operation, a user may rotate the first handle 802 or the second handle 808, causing the spindle 820 to rotate. The rotation of the spindle 820 causes the transmission plate 828 to move within the cage 832, thereby horizontally moving the latch 816 to retract within the latch housing 824. With enough rotation of the spindle 820, the end of the latch 816 is fully retracted within the latch assembly 818 and the end of the latch 816 does not extend past the plate 814 (as shown in FIG. 16). In this position, the latch no longer engages with a catch plate in the corresponding door frame, and no longer fixes the position of the door with respect to the frame. Upon release of the first handle 802 or second handle 808, the spring assembly 806 and 812 will rotate the spindle 820 back into the resting position, as shown in FIG. 15, with the end of the latch 816 extending past the plate 814. A user may also push on the end of the latch, compressing spring assembly 826, and the latch 816 will slide into the latch assembly 818 without turning either the first handle 802 or the second handle 808. Once the user releases the latch 816, the stored energy in the compressed spring assembly 826 is released, and the latch returns to its resting position.

In some examples, the door positioning system 100 may include the doorknob assembly 800.

FIGS. 17-20 are various views of components of an example door positioning system in accordance with the present disclosure.

Figure 17:
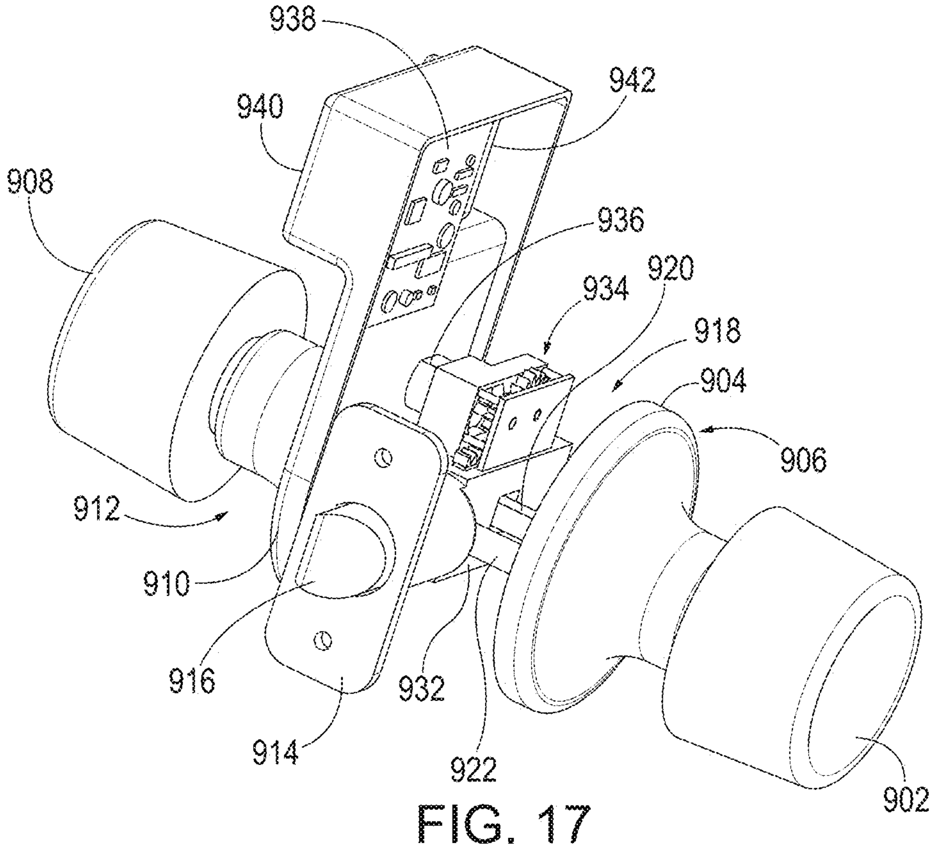
FIG. 17 is a perspective view of components of an example door positioning system in accordance with the present disclosure.
Figure 18:
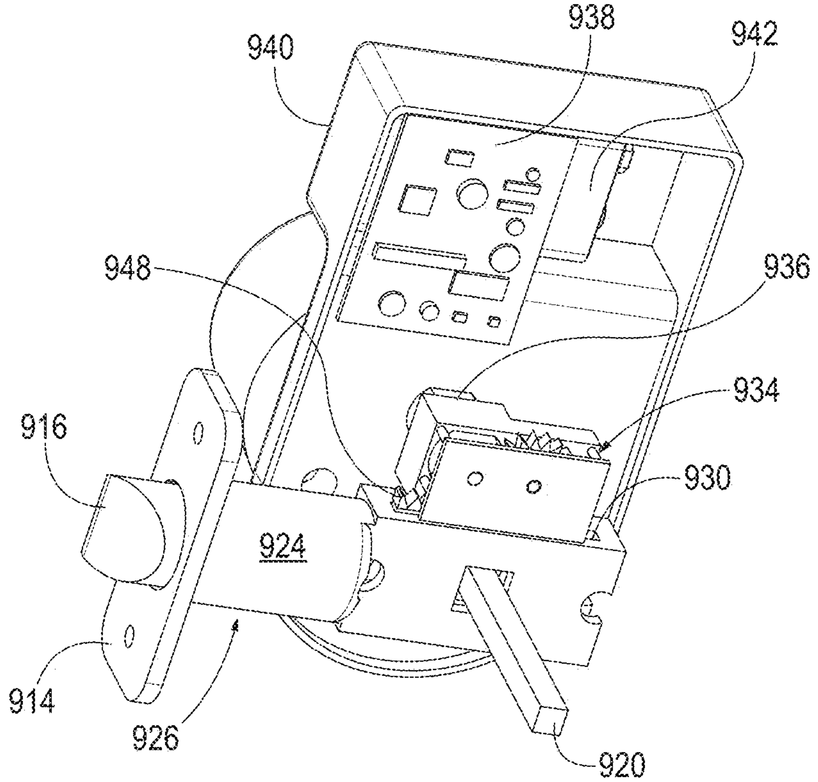
FIG. 18 is a perspective view of components of an example door positioning system in accordance with the present disclosure.

Similar to FIG. 15, FIG. 17 includes a doorknob assembly 900 with a first handle 902, a first handle rosette 904 including a spring assembly 906, a second handle 908, and a second handle rosette 910 including a spring assembly 912. FIG. 18 is similar to FIG. 17, but without the first handle 902, first handle rosette 904 and spring assembly 906. The doorknob assembly 900 also includes a spindle 920 with two fasteners 922, each fastener 922 positioned on either side of the spindle 920. The fasteners 922 and spindle 920 may be coupled to a latch assembly 918, and the spindle 920 is coupled to both handles 902 and 908. The doorknob assembly 900 also includes the latch assembly 918, which includes plate 914 positioned at an end of the latch assembly 918, the plate 914 connected to a latch housing 924 connected to a cage 932. A latch 916 is positioned within the latch housing 924, with a spring assembly 926 and coupled to a transmission plate 928 positioned within the cage 932. A top portion of the transmission plate 928 extends through a slot 930 formed in the top of the 932.

Figure 19:
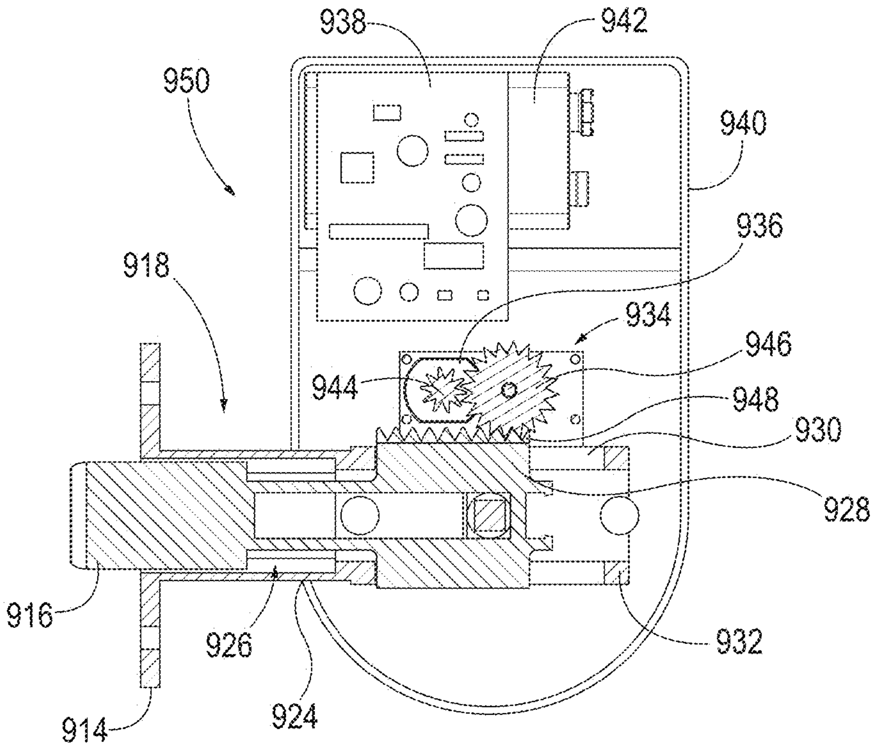
FIG. 19 is a front view of components of an example door positioning system in accordance with the present disclosure.
Figure 20:
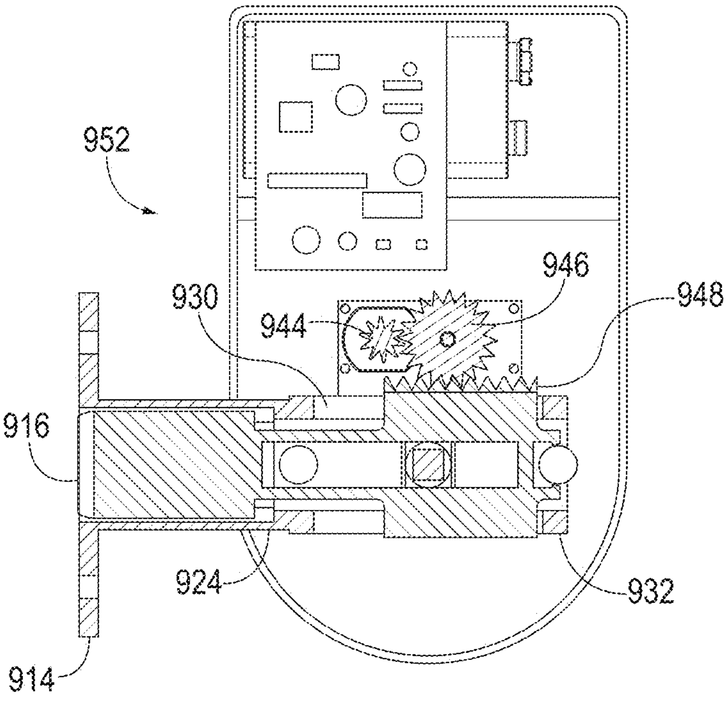
FIG. 20 is a front view of components of an example door positioning system in accordance with the present disclosure.

In addition, doorknob assembly 900 may also include motor 936 and gearbox 934, the output of the gearbox 934 coupled to a gear rack 948 positioned on the top edge of the transmission plate 928 (see FIGS. 19 and 20). While a gearbox is shown in FIGS. 17-20, other types of power transmission assemblies may be used, such as clutches, belt drives, and the like. The engagement of the motor 936 with the transmission plate 928 may also be accomplished using a gearbox 934 and gear rack 948, with the gear rack 948 not directly coupled to the -transmission plate 928 but forming a cage around it. The doorknob assembly 900 may also include a PCBA 938 and battery 942 electrically coupled to the motor 936 to help power and control the motor 936.

FIG. 19 is a view of the latch assembly 918 in a latch engaged position 950. FIG. 20 is a view of the latch assembly 918 in a disengaged latch position 952, with the latch fully retracted within the latch housing 924.

In some examples, the power transmission assembly is coupled to the doorknob motor and translates a rotational movement of the doorknob motor to a linear movement of a latch mechanism responsive to receipt of the signal. In some examples, the door positioning system will be engaged after the latch mechanism is confirmed to be disengaged from door frame.

The power transmission assembly include the gearbox 934 and the doorknob motor 936. The gearbox 934 may include a driver gear 944 and a driven gear 946. In some examples, the driver gear 944 is coupled to the output shaft of the doorknob motor. The driver gear 944 engages with the output gear, or driven gear 946 of gearbox 934, which then engages the gear rack 948 attached to the transmission plate 928 extending out of the slot 930. When triggered by a signal sent by a remote computing device, the motor 936 turns on and the engagement of the driven gear 946 with the gear rack 948 retracts the latch 916 within the latch housing 924, disengaging the latch 916 from holding the door in place.

After a designated time or other signal sent from the remote computing device, the motor 936 returns the transmission plate 928 to its original position. In the example of doorknob assembly 900, the second handle rosette 910, is expanded to include a housing 940 to provide space for the PCBA 938 with wireless control and operation and battery 942. The housing 940 may also include buttons that enable a user to access or control the motor 936 and related mechanisms.

In some examples, the door positioning system 100 includes a smarthome door lock, such as doorknob assembly 900. In some examples, a smarthome lock may be a device that can lock and unlock door locks using an app or program on a remote computing device and use a variety of different home network protocols including but not limited to ZigBee, zwave, Bluetooth, and wifi. In some examples, the door positioning system 100, including the door lock, can be interfaced directly or via external communication hub (smarthome hub) with a smartlock to provide unique and novel functionality. The user can use a door positioning system to close a door then engage a smartlock, such as doorknob assembly 900, remotely. In some examples, with appropriately configured door hardware, such as but not limited to a non-manually latching door knob or an electronically controlled latching door knob, the door positioning system can be used to open a door that is unlocked via a smartlock. For example, the door positioning system would be used to disengage the smartlock, such as doorknob assembly 900, then the door positioning device would engage to open the door. Similarly, the door positioning system may include a smart doorknob that may be used in conjunction with the door positioning device.

In some examples, the smart doorknob provides a power driven system to unlatch the door knob. The latch is moved to the returned position by spring force. The smart doorknob may include a motor, circuitry, such as a PCBA electrically coupled to the motor and configured to be remotely connected to the remote computing device or activated by buttons on the smart doorknob itself. For example, when a signal is received by the smart doorknob, the motor may engage a power transmission assembly, such as a gear rack or similar power transmission elements that transform rotational motion and power into linear motion and power. This linear motion will retract the latch from the door jamb, in the disengaged latch position, and with the latch retracted, the door would be free swinging and the floor drive door positioning system could then drive the door to the desired position.

Figure 21:
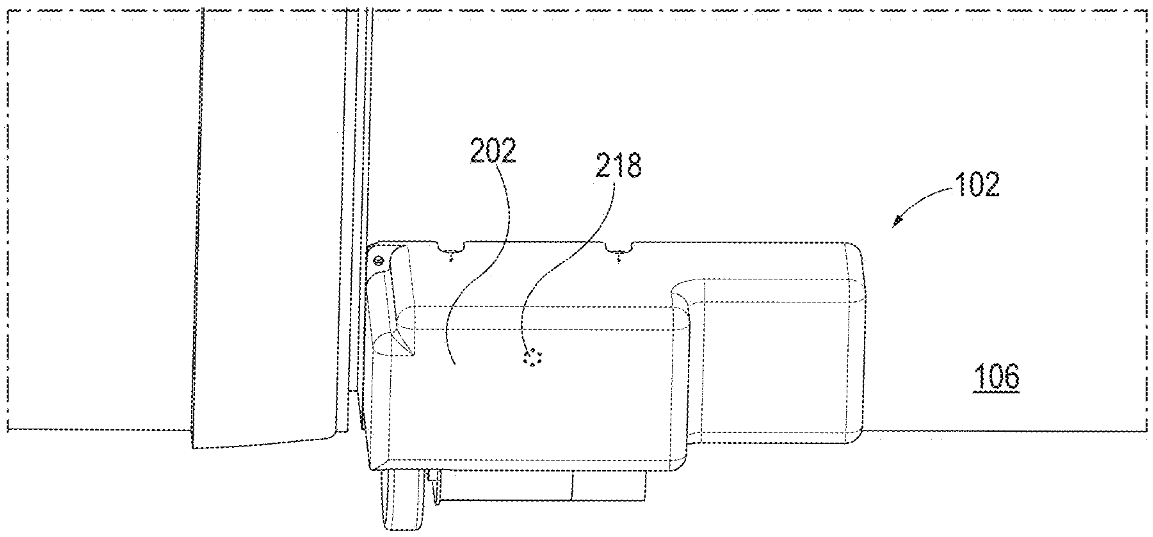
FIG. 21 is a perspective view of components of an example door positioning system in accordance with the present disclosure.
Figure 22:
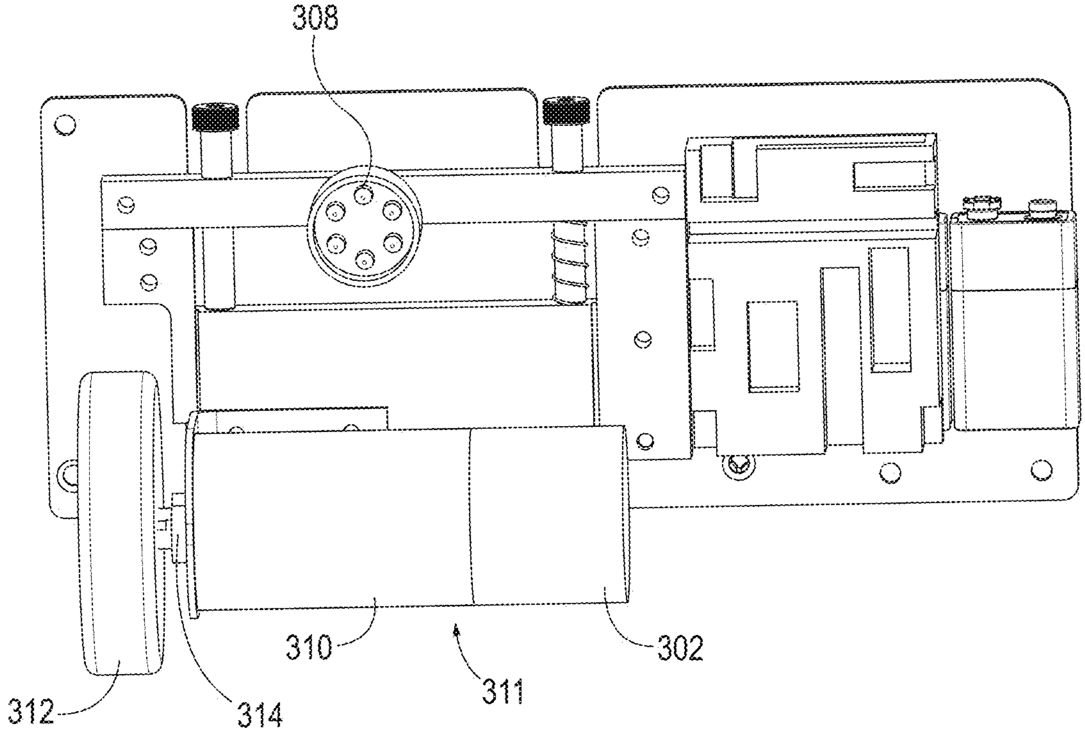
FIG. 22 is perspective view of components of an example door positioning system in accordance with the present disclosure.

FIGS. 21 and 22 are perspective views of components of an example door positioning system in accordance with the present disclosure. FIG. 21 is an embodiment of a door positioning device 102 with a speaker grill 218, the door positioning device positioned on a door 106. FIG. 22 is the door positioning device of FIG. 21 with the door positioning device 102 with the enclosure cover 202 hidden. As shown in FIG. 22, the power transmission assembly 332 includes the motor 302 and gearbox 310 as an integrated gearbox 311 with an offset output shaft 314. In some examples, the drive wheel 312 may be fixed to the output shaft so that the drive wheel is directly driven by the gearbox output shaft. In other examples, a friction drive with components positioned on the inner surface of the drive wheel and at the end of the output shaft may be used to transmit power from the output shaft to the drive wheel.

In some examples, the offset output shaft 314 may be used so that the appropriately sized motor 302 and gearbox 310, which may be part of the integrated gearbox 311, are positioned close or as close to the baseplate 210, while still allowing the proper clearance for the drive wheel 312. This helps to make the overall design of the door positioning device 102 compact and desirable for residential or non-commercial use. FIG. 22 also shows the speaker 308 and battery 935. Similar to FIG. 6, the power transmission assembly, speaker, and batter may all be electrically connected and may be operated responsive to a remote signal being received by the door positioning device 102.

Figure 31:
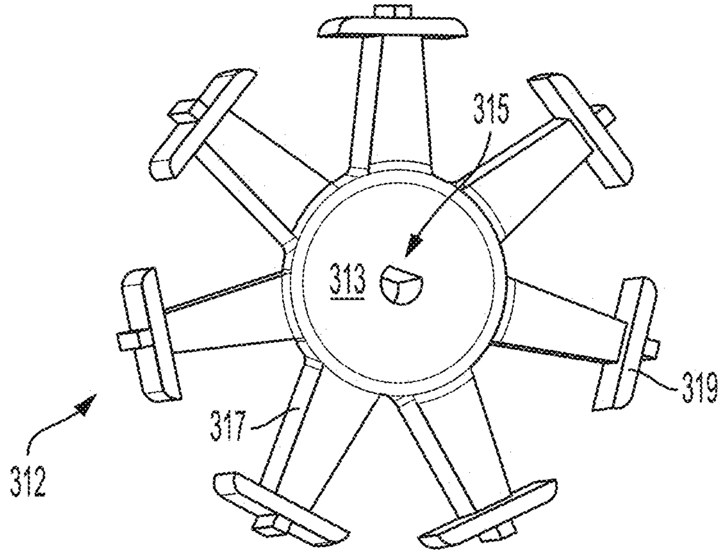
FIG. 31 is a perspective view of components of an example door positioning system in accordance with the present disclosure.
Figure 32:
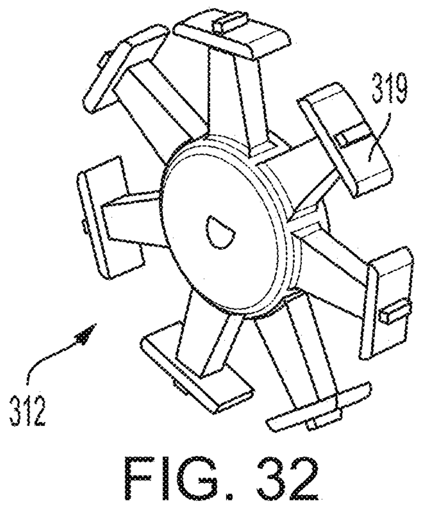
FIG. 32 is a perspective view of components of an example door positioning system in accordance with the present disclosure.
Figure 33:
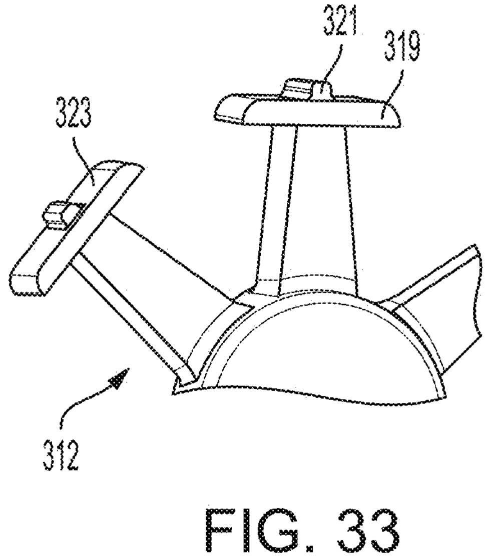
FIG. 33 is an partial perspective view of components of an example door positioning system in accordance with the present disclosure.

FIGS. 31-33 are perspective views of the drive wheel 312 an example door positioning system in accordance with the present disclosure. In some examples, the drive wheel 312 has a discontinuous outer perimeter, such that the drive wheel 312 includes spokes 317 with feet 319 positioned at an end opposite a central hub 313. The discontinuous perimeter may help provide traction on different surfaces. The central hub 313 may couple with the output shaft of the gearbox 310 or integrated gearbox 311 at a keyway 315, extending through the central hub. The keyway 315 may be shaped to mate with a keyed shape of the output shaft so that the shaft of the gearbox will not rotate with within the keyway 315, and the wheel is driven directly from the output shaft of the gearbox.

In some examples, extending radially outward from the central hub 313 of the drive wheel 312 are a series of spokes 317. In some examples, the wheel 312 may include a plurality of spokes, for example, two, three, four, five, six, seven, eight, nine or ten spokes. In some examples, the drive wheel includes more than 10 spokes.

In some examples, the central hub 313 is a rigid core. In some examples, the spokes 317 are rigid. In some examples, the central hub 313, spokes 317 and feet 319 are rigid. In some examples, the feet 319 include a raised post or protruding thread 321 positioned on an outward facing surface of the foot 319. The raised post 321 may be provide additional traction when the foot contacts the floor or surface when the door positioning system is engaged. In some examples, the edge of the feet may be tapered or chamfered. This may help the foot to engage the floor or surface when the wheel is rotating.

In some examples, as shown in FIG. 33, the individual foot 319 may include a surface treatment 323. In some examples, the surface treatment 323 covers the foot 319 and the raised post 321. The surface treatment may be a high friction material, such as a various rubber material, and the surface treatment may be over-molded or wrapped onto the feet. In some examples, the surface treatment may include a light adhesive or additional material aspect to increase the coefficient of friction of the surface treatment 323.

Figure 23:
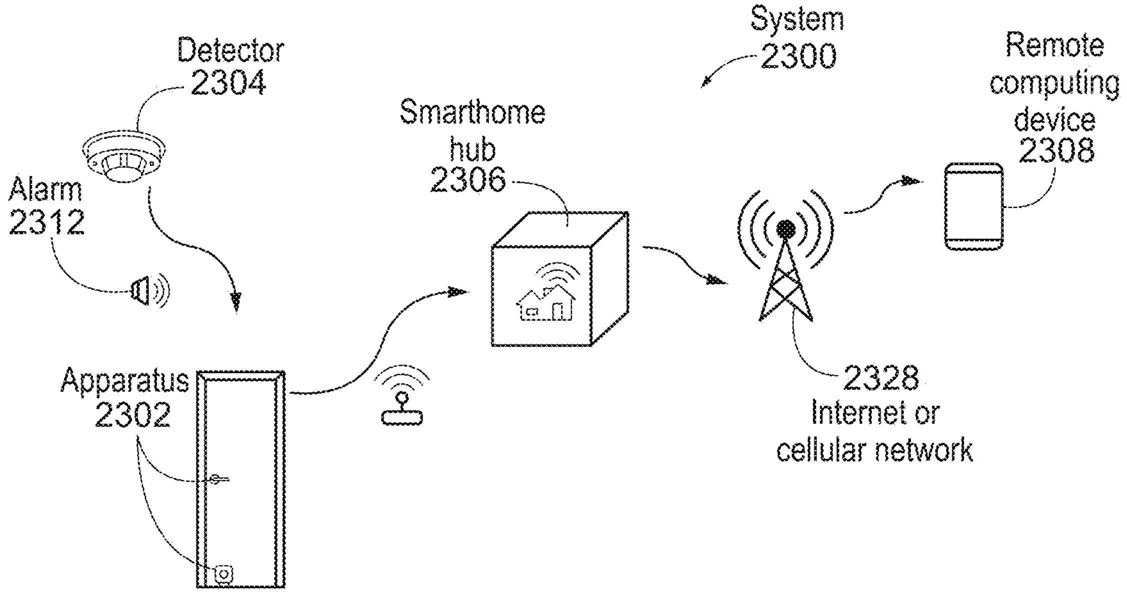
FIG. 23 is a schematic of an example system in accordance with the present disclosure.

FIGS. 23-30 are schematics of example systems with an apparatus in accordance with the present disclosure. The apparatus can be implemented using any of the door positioning systems described herein, such as door positioning device 102 of FIGS. 1-14 and the doorknobs 800, 900 of FIGS. 15-20. FIG. 23 is a schematic of an example system in accordance with the present disclosure. The system 2300 may include an apparatus 2302, a detector 2304, a smarthome hub 2306, a remote computing device or mobile device 2308, and an alarm 2312. In some examples, the components of the system 2300 may be connected to one or more of each other.

In some examples, the apparatus 2302 may be an apparatus for receiving a remote signal and coupled to a control system and communication system. In some examples, the control system and communication system form part of the apparatus. In some examples, the apparatus is mounted to, coupled to, or mounted within a door and uses the door's hinged motion to help move the door from an open position to a closed position.

In some examples, the detector 2304 may be a detection device, for example a smoke detector, fire detector, gas detector, motion sensor, a temperature detector, a carbon monoxide detector, a home alarm system, a mobile device, or a smarthome hub.

In some examples, the smarthome hub 2306 may include multiple radios. In some examples, the smarthome hub 2306 may provide an external communication to the internet or cellular network 2328.

In some examples, the mobile device 2308 may be a tablet, mobile phone, laptop, computer, or other device where a wireless connection may be made to the apparatus 2302. In some examples, the mobile device may be a home alarm interface. In some examples, the mobile device 2308 may be a device that is wired with a physical connection to the apparatus 2302. In some examples, a connection may be made between the apparatus 2302 and the mobile device 2308 using a web browser, an app, a blue tooth, or a potentially wired connection using the internet or cellular network 2328.

In some examples, the alarm 2312 may be used to notify a user that the detector 2304 has detected an issue. In some examples, the detector 2304 detects an issue, such as smoke, fire, temperature change, gas presence, etc., and activates an alarm 2315. In some examples, the alarm 2312 may be audible, visual, haptic, or various combinations thereof.

In some examples, the detector 2304 may detect an issue. The detector 2304 may then send a detection signal to the alarm 2312 to issue an alarm. In some examples, the alarm may be an audible alarm similar to the audible alarm issued by a smoke or fire alarm. In some examples, the detector 2304 may send a wireless detection signal to the alarm 2312 to issue an alarm signal. In some examples, the detector 2304 and the alarm 2312 may be combined into a device that may send a signal to the apparatus 2302.

The apparatus 2302 may receive the signal from the alarm 2312. In some examples, the apparatus 2302 may wirelessly receive the signal from the alarm 2312. In some examples, the signal from the alarm 2312 may be transmitted from the alarm 2312 to the apparatus 2302 via a direct line or electrical connection. In response to receiving the signal, the apparatus 2302 may shut the door that the apparatus is coupled to or installed within. The apparatus 2302 may also then send a signal to the smarthome hub 2306 that the door has been shut, the detector 2304 has detected an issue, and/or that the alarm 2312 has issued an alarm.

In some examples, the smarthome hub 2306 may receive the signal from the apparatus 2302. The smarthome hub 2306 may then send a signal to the mobile device 2308. In some examples, the smarthome hub 2306 may send and receive signals from the apparatus 2302 and mobile device 2308. In some examples, the signal from the smarthome hub 2306 may be transmitted through a wireless internet connection, Bluetooth, cellular connection, or other type of connection to the mobile device 2308. In some examples, the user may then engage the mobile device 2308 to select an action, such as reset the alarm, reset the detector, send a communication to a third party, such as an emergency services provider, etc.

Figure 24:
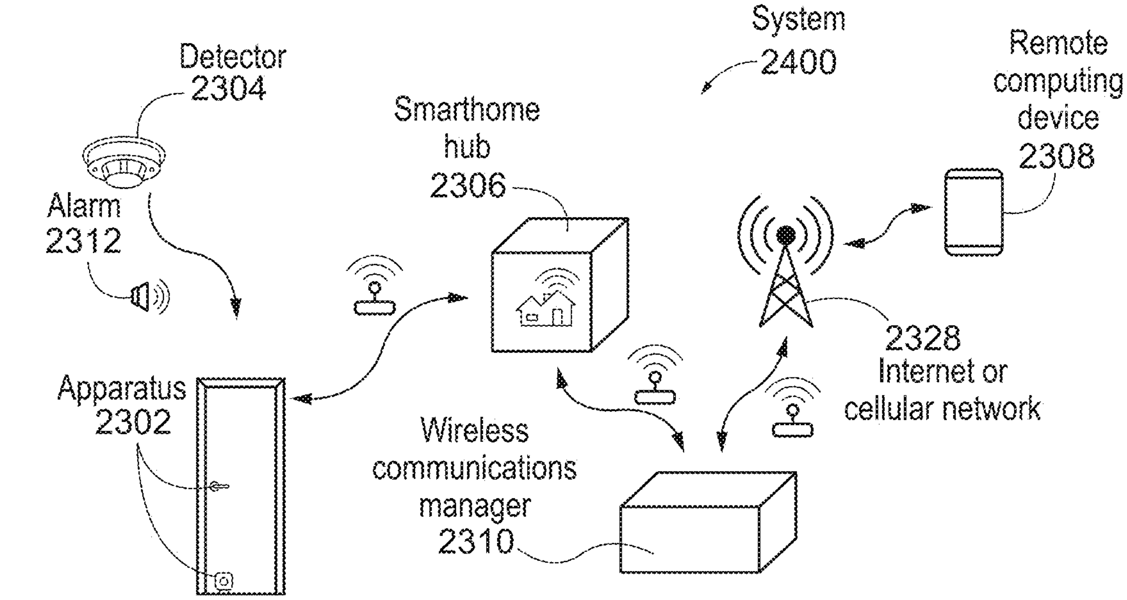
FIG. 24 is a schematic of an example system in accordance with the present disclosure.

FIG. 24 is a schematic of another example system.

The system 2400 may be similar to the system 2300 and include an apparatus 2302, a detector 2304, a smarthome hub 2306, a mobile device 2308, a wireless communication manager 2310, and an alarm 2312. In some examples, the components of the system 2400 may be connected to one or more of each other. In some examples, the system 2400 may be similar to the system 2300, except that the system 2400 may include the wireless communication manager 2310.

In some examples, the system 2400 may also be different in that the apparatus 2302 may send and receive signals from the smarthome hub 2306. The smarthome hub 2306 may send and receive signals from the wireless communication manager 2310. The wireless communication manager 2310 may send and receive signals to the internet or cellular network 2328. The mobile device 2308 may send and receive signals to the internet or cellular network 2378.

In some examples, the wireless communications manager 2310 may be a residential or commercial wireless internet router. In some examples, the wireless communications manager 2310 may provide external communication to the internet or cellular network 2328. In some examples, the wireless communications manager 2310 may provide external communication to the internet for the system if the external communication is not provided by an alternate component, such as a smarthome hub 2306.

In some examples, the smarthome hub 2306 may send a signal regarding the status of the apparatus 2302, the detector 2304, or the alarm 2312, to the wireless communications manager 2310. In some examples, the wireless communications manager 2310 may then send a signal to the mobile device 2308 via internet or cellular network 2328.

Figure 25:
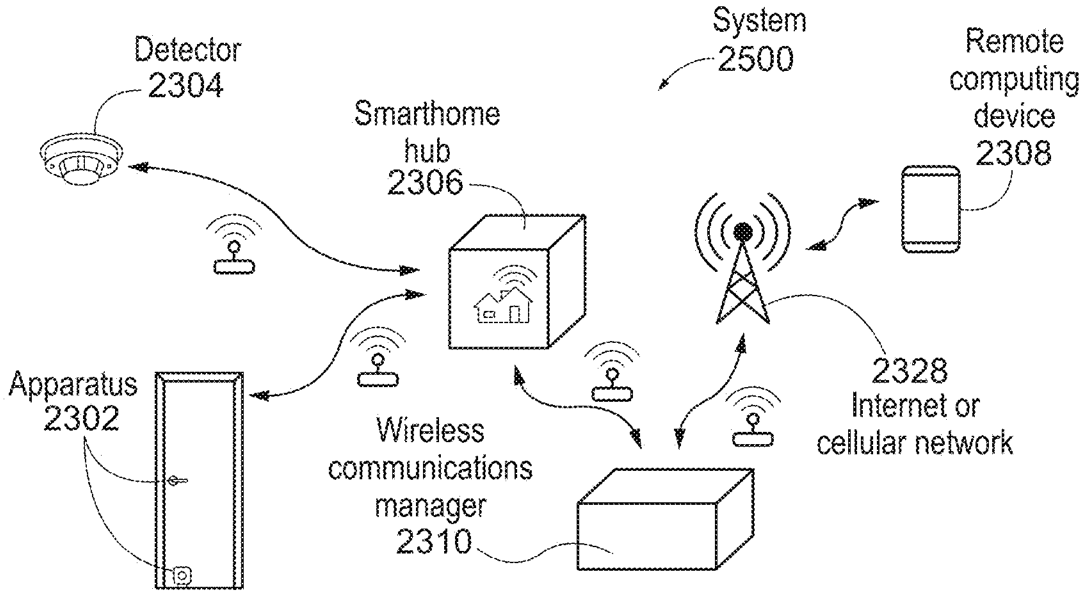
FIG. 25 is a schematic of an example system in accordance with the present disclosure.

FIG. 25 is a schematic of an example system. The system 2500 may be similar to the system 2400 and include an apparatus 2302, a detector 2304, a smarthome hub 2306, a mobile device 2308, and a wireless communication manager 2310. The system 2500 may differ from the system 2400 in that the system 2500 does not have an alarm 2312 separate from the detector 2304. In some examples, the detector 2304 may send and receive a signal to the smarthome hub 2306, which may receive the signal and then send a signal to the apparatus 2302. The smarthome hub 2306 may also then send and receive a signal to the wireless communications manager 2310, which may send and receive a signal to the mobile device 2308 via the internet or cellular network 2328.

Figure 26:
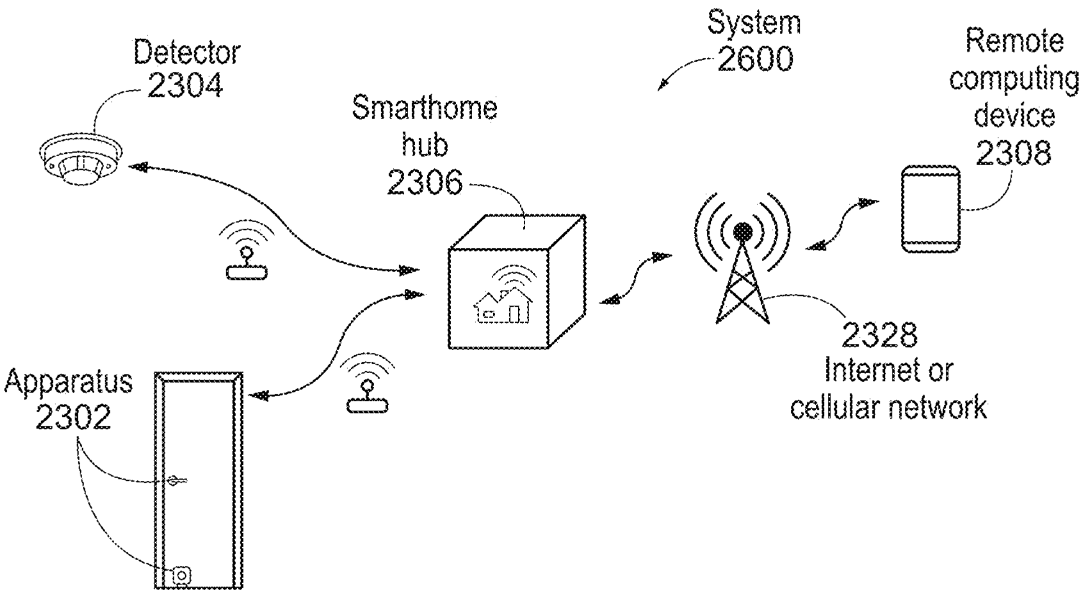
FIG. 26 is a schematic of an example system in accordance with the present disclosure.

FIG. 26 is a schematic of an example system. The system 2600 may be similar to the system 2500 and include an apparatus 2302, a detector 2304, a smarthome hub 2306, and a mobile device 2308. The system 2600 may differ from the system 2500 in that the wireless communication manager 2310 may not be utilized. In the system 2600, the smarthome hub 2306 may send and receive a signal to the mobile device 2308 via the internet or cellular network 2328.

Figure 27:
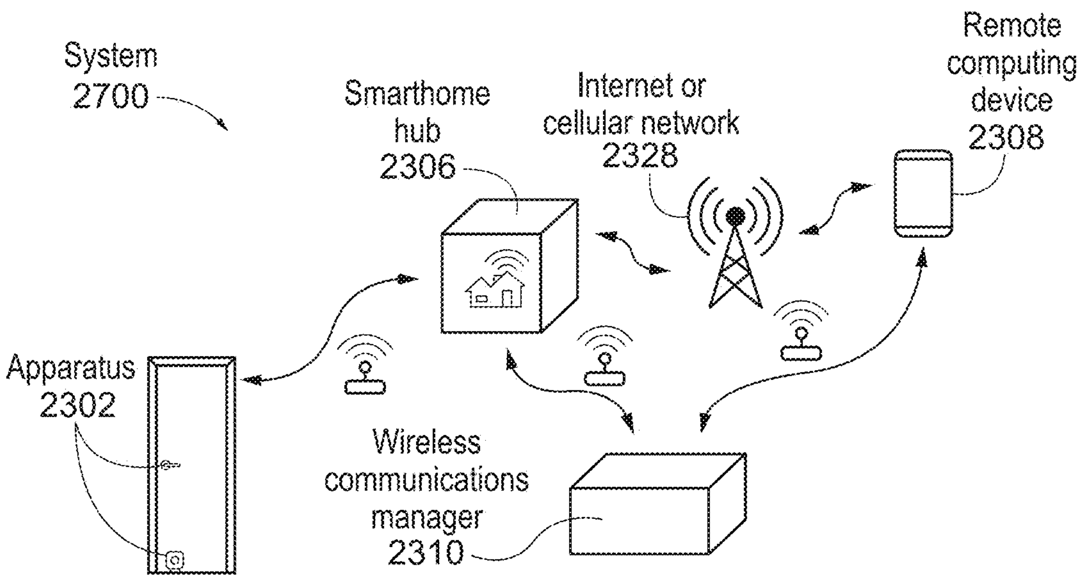
FIG. 27 is a schematic of an example system in accordance with the present disclosure.

FIG. 27 is a schematic of an example system. The system 2700 of FIG. 27 may be similar to the system 2500 of FIG. 25. In some examples, the system 2700 may include an apparatus 2302, a smarthome hub 2306, a mobile device 2308, and a wireless communication manager 2310. The system 2700 may differ from the system 2500 in that a detector 2304 may not be utilized. In the system 2700, the smarthome hub 2306 may send and receive a signal to and from the apparatus 2302.

Figure 28:
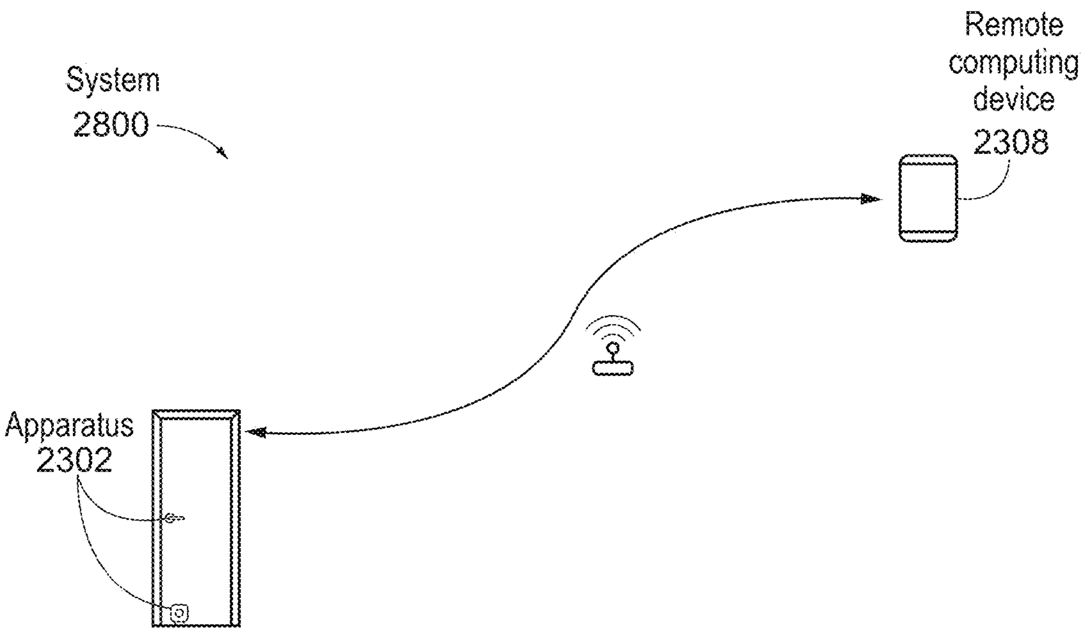
FIG. 28 is a schematic of an example system in accordance with the present disclosure.

FIG. 28 is a schematic of an example system. The system 2800 of FIG. 28 may be similar to previously disclosed examples. The system 2800 may include an apparatus 2302 and a mobile device 2308. In some examples, the apparatus 2302 and mobile device 2308 may be wirelessly coupled so that signals may be sent and received between the two.

Figure 29:
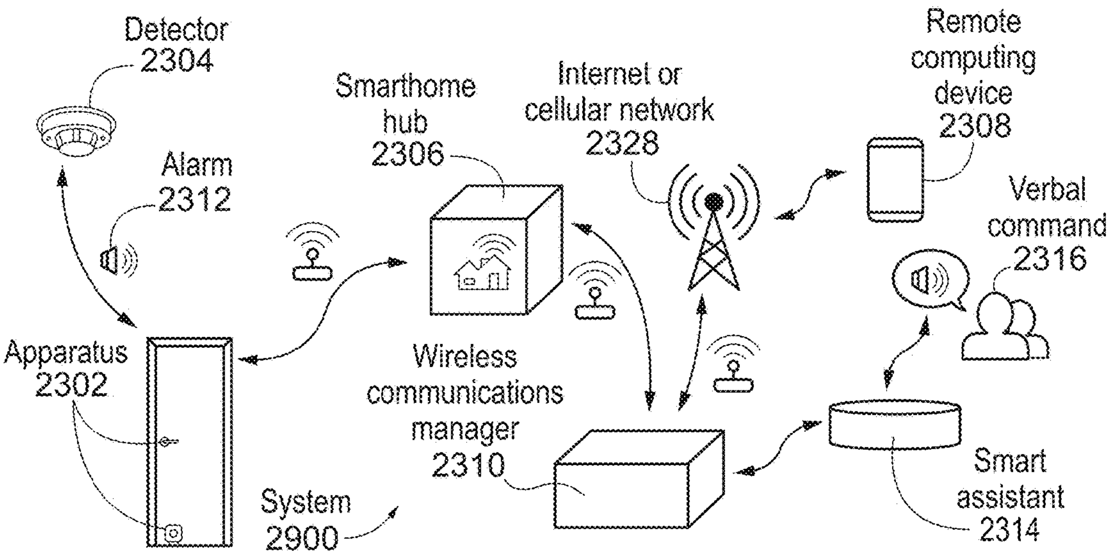
FIG. 29 is a schematic of an example system in accordance with the present disclosure.

FIG. 29 is a schematic of an example system. The system 2900 may be similar to the system 2400 of FIG. 24. The system may include an apparatus 2302, a detector 2304, a smarthome hub 2306, a mobile device 2308, a wireless communication manager 2310, an alarm 2312, and a smart assistant 2314 which may be used to receive and send a signal based upon verbal command 2316.

In some examples, the smart assistant 2314 may be a device that responds to verbal commands from a user. In some examples, the smart assistant 2314 may provide external communication to the internet or cellular network. In some examples, a verbal command 2316 may be issued or provided from a user. In some examples, a verbal command may be issued or provided from an electronic device.

In some examples, the wireless communication manager 2310 may be able to send and receive signals from the smart assistant 2314. In some examples, the smart assistant may be able to send and receive signals to the issuer of a verbal command 2316. In some examples, the issuer of the verbal command 2316 is a human user. In some examples, the issuer of the verbal command may be an electronic device.

Figure 30:
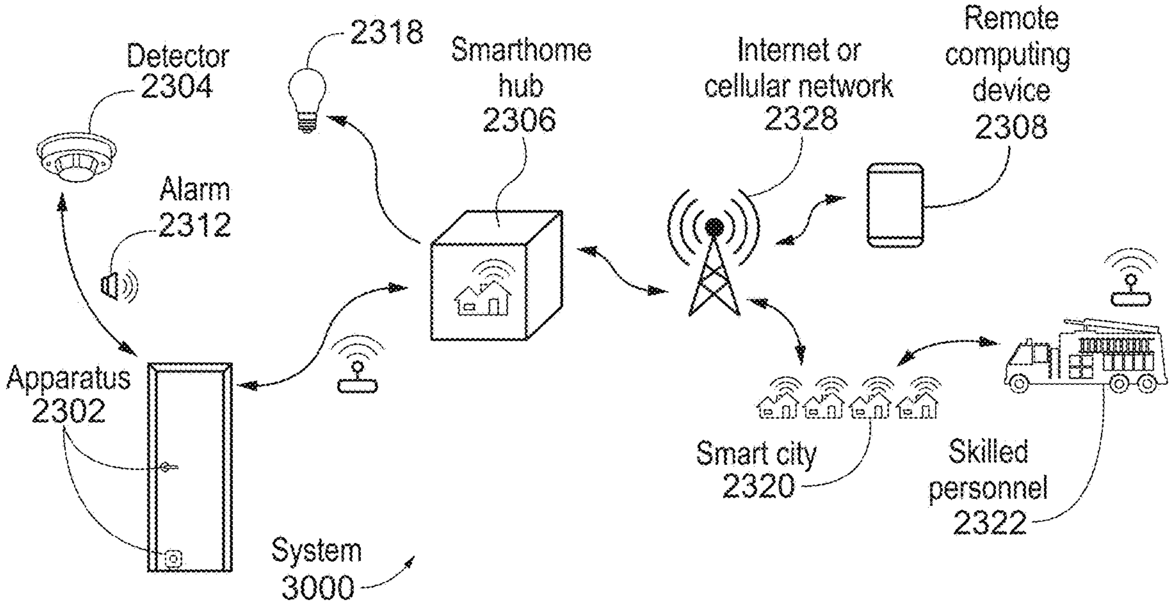
FIG. 30 is a schematic of an example system in accordance with the present disclosure.

FIG. 30 is a schematic of an example system. The system 3000 may be similar to the system 2300 of FIG. 23. The system may include an apparatus 2302, a detector 2304, a smarthome hub 2306, a mobile device 2308, an external indicator 2318, an alarm 2312, a smart city 2320, and skilled personnel 2322.

In some examples, the external indicator 2318 may be a visual component, such as a light being turned on or off. In some examples, the external indicator 2318 may change or alter a structure, such as flipping or moving a sign to provide an indication of a status of the system. In some examples, a smart city 2320 may be created based upon linking multiple individual smart homes or smarthome hubs 2306. In some examples, the skilled personnel 2322 may include but are not limited to emergency responders, firefighters, first responders, police, EMTs, medics, childcare providers, social service providers, elder care providers, offsite family members, etc.

In some examples, the apparatus 2302 may be used to evaluate if a room is occupied and if the apparatus has been activated. This may be useful to skilled personnel 2322 so that they may focus rescue efforts to a maximum benefit and safety.

In some examples, the smarthome hub 2306 may send a signal to the external indicator 2318. In an example, the use of the external indicator 2318 may allow skilled personnel 2322 to understand the status of a room that the apparatus 2302 is installed within. In some examples, if the door the apparatus has been coupled to has been closed, the skilled personnel 2322 may use this information to select the best tactics and area to investigate first, perform search and rescue operations, vent-enter-search operations, etc.

In some examples, the smarthome hub 2306 may be linked to other smarthome hubs to help create a smart city 2320. In some examples, the smart city may be used to send and receive signals from a network of the smarthome hubs 2306 and to skilled personnel 2322. In some examples, skilled personnel 2322 may activate different apparatus 2302 in different or adjacent homes or areas. In some examples, suddenly closing doors may surprise and deter unwanted entrants or intruders as part of a home alarm system, and may be engaged when a known intruder is in the area. In some examples, the skilled personnel 2322 may send and receive signals from the apparatus 2302 if there is an uncontrolled fire or risk of fire expanding to additional homes.

The apparatus and systems described herein may be combined in various forms and manners to use the apparatus that may close a door in response to receiving a signal.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present devices, systems, and structures described herein, and do not create limitations, particularly as to the position, orientation, or use of the disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments as defined in the claims. Although various embodiments of the claimed disclosure have been described above with a certain degree of particularity, or with reference to one or more individual embodiments, those skilled in the art could make numerous alterations to the disclosed embodiments without departing from the spirit or scope of the claimed disclosure. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the disclosure as defined in the following claims.

What is claimed is:

1. A door positioning apparatus, comprising:

a baseplate configured to be coupled to a bottom portion of a door;

a main motor;

a circuitry electrically coupled to the main motor and configured to be in communication with a remote computing device;

a drive member coupled to the main motor and the circuitry, the drive member comprising an external surface, the external surface of the drive member configured to contact a surface adjacent the door; and the drive member moveably mounted to the baseplate through at least one spring element to allow the drive member to move upward and downward relative to the baseplate, the at least one spring element biasing the drive member away from the baseplate to maintain contact with the ground surface during operation of the door positioning apparatus;

the main motor configured to be remotely activated by the remote computing device to engage the drive member to contact the surface adjacent the door to reposition the door responsive to receipt of a signal, further comprising:

a doorknob motor;

doorknob circuitry electrically coupled to the doorknob motor and configured to be remotely connected to the remote computing device;

a power transmission assembly coupled to the doorknob motor and configured to translate a rotational movement of the doorknob motor to a linear movement of a latch mechanism responsive to receipt of the signal.

2. The door positioning apparatus of claim 1, wherein the main motor is configured to harvest energy generated by rotation of the main motor when the drive member travels during motion of the door.

3. The door positioning apparatus of claim 1, wherein the latch mechanism comprising a latch with a first end and a second end, and a latch housing with a hollow central portion and a first end formed by a plate with an aperture connected to the hollow central portion;

wherein the power transmission assembly is coupled to the second end of the latch;

wherein in response to the receipt of the signal, the power transmission assembly is configured to horizontally translate the latch within the hollow central portion of the latch housing and the first end of the latch is positioned within the aperture of the plate or within the hollow central portion of the latch housing; and wherein the latch mechanism is configured to be coupled to a first doorknob and a second doorknob.

4. The door positioning apparatus of claim 1, wherein the drive member is configured to accommodate different doors and surfaces.

5. The door positioning apparatus of claim 1, wherein the door positioning apparatus is configured to receive the signal from at least one of the following: a smoke detector, a temperature detector, a carbon monoxide detector, a home alarm system, a mobile device, or a smarthome hub.

6. The door positioning apparatus of claim 1, further comprising a gearbox coupling the main motor and the drive member, wherein the drive member is coupled to an output shaft of the gearbox.

7. The door positioning apparatus of claim 1, wherein the door positioning apparatus comprises a receiver configured to receive the signal and a processor configured, responsive to the signal, to trigger the motor to move the door into the closed door position.

8. The door positioning apparatus of claim 1, further comprising a bracket biasedly coupled to the baseplate, the motor and drive member coupled to the bracket, and wherein the biased coupling of the bracket to the baseplate is configured to adjust a vertical position of the drive member with respect to the baseplate.

9. The door positioning apparatus of claim 1, further comprising a bracket configured to be coupled to the bottom portion of the door and biasedly coupled to the baseplate, the motor and drive member coupled to the baseplate, and wherein the biased coupling of the bracket to the baseplate is configured to adjust a vertical position of the drive member with respect to the bracket.

10. The door positioning apparatus of claim 1, further comprising a speaker electrically coupled to the circuitry and configured to produce an audio signal responsive to receipt of the signal.

11. The door positioning apparatus of claim 1, further comprising an LED electrically coupled to the circuitry and configured to produce a visual signal visible on an exterior of the apparatus responsive to receipt of the signal.

12. The door positioning apparatus of claim 1, further comprising a manual override button electrically coupled to the circuitry and configured to override the remote activation of the motor responsive to receipt of the signal.

13. A door positioning apparatus, comprising:

a baseplate configured to be coupled to a bottom portion of a door;

a main motor;

a circuitry electrically coupled to the main motor and configured to be in communication with a remote computing device;

a drive member coupled to the main motor and the circuitry, the drive member comprising an external surface, the external surface of the drive member configured to contact a surface adjacent the door; and the drive member moveably mounted to the baseplate through at least one spring element to allow the drive member to move upward and downward relative to the baseplate, the at least one spring element biasing the drive member away from the baseplate to maintain contact with the ground surface during operation of the door positioning apparatus;

the at least one spring element biasing the drive member away from the baseplate to maintain contact of the drive member with the ground surface during operation of the door positioning apparatus;

the main motor configured to be remotely activated by the remote computing device to engage the drive member to contact the surface adjacent the door to reposition the door responsive to receipt of a signal further comprising a brake motor coupled to a brake, wherein the brake motor is configured to move the brake into an engaged position to prevent movement of the drive member and wherein the brake motor is configured to be remotely activated by the remote computing device responsive to receipt of the signal.

14. The door positioning apparatus of claim 13, further comprising an internal bracket elastically and slidably coupled to the baseplate through the at least one spring element to move relative to the baseplate, wherein the brake motor is mounted to the internal bracket.

15. The door positioning apparatus of claim 14, further comprising a brake gearbox coupling the brake motor and the brake.

16. A door positioning apparatus comprising:
a door positioning device comprising:
a baseplate configured to be coupled to a bottom portion of a door;
an internal bracket elastically and slidably coupled to the baseplate through at least one spring element to move relative to the baseplate;
a main motor mounted to the internal bracket;
circuitry electrically coupled to the main motor and configured to be in communication with a remote computing device;
at least one proximity sensor electrically coupled to the circuitry and configured to determine a door position; and
a drive member coupled to the main motor and the circuitry, the drive member comprising an external surface, the external surface of the drive member configured to contact a surface adjacent the door;
a latching doorknob comprising:
a doorknob motor;
a doorknob circuitry electrically coupled to the doorknob motor and configured to be communication with the remote computing device;
a power transmission assembly coupled to the doorknob motor and configured to translate a rotational movement of the doorknob motor to a linear movement of a latch mechanism responsive to receipt of a signal;
the doorknob motor configured to be remotely activated by the remote computing device to engage the power transmission assembly responsive to receipt of the signal to disengage the latch mechanism from a door frame; and
the motor configured to be remotely activated by the remote computing device to engage the drive member to rotatably contact the ground surface to reposition the door responsive to receipt of the signal and after the latch mechanism is confirmed to be disengaged from the door frame.

17. The door positioning apparatus of claim 16, wherein the latch mechanism is configured to be coupled to a first doorknob and a second doorknob.

18. The door positioning apparatus of claim 16, wherein the baseplate has a slot, and wherein the internal bracket has a tab engaging the slot formed in the baseplate for dynamically adjusting a position of the drive member relative to the baseplate via the interaction of the tab of the internal bracket, the slot in the baseplate and the at least one spring element during the operation of the door positioning apparatus.

19. The door positioning apparatus of claim 16, wherein the at least one spring element biases the internal bracket away from the baseplate.

* * * * *